US011827457B2

(12) United States Patent
Du Bois

(10) Patent No.: US 11,827,457 B2
(45) Date of Patent: Nov. 28, 2023

(54) SYSTEM, METHOD, AND APPARATUS FOR ACCEPTANCE AND DELIVERY OF FLAT OBJECTS

(71) Applicant: Dean Du Bois, Clearwater, FL (US)

(72) Inventor: Dean Du Bois, Clearwater, FL (US)

( * ) Notice: Subject to any disclaimer, the term of this patent is extended or adjusted under 35 U.S.C. 154(b) by 0 days.

(21) Appl. No.: 17/737,097

(22) Filed: May 5, 2022

(65) Prior Publication Data
US 2023/0049985 A1    Feb. 16, 2023

Related U.S. Application Data

(63) Continuation-in-part of application No. 17/401,395, filed on Aug. 13, 2021, now Pat. No. 11,350,780.

(51) Int. Cl.
| | | |
|---|---|---|
| *B65G 33/06* | (2006.01) | |
| *B65G 47/90* | (2006.01) | |
| *A47G 23/08* | (2006.01) | |
| *A47F 10/06* | (2006.01) | |
| *A47J 39/02* | (2006.01) | |

(52) U.S. Cl.
CPC ............. *B65G 33/06* (2013.01); *A47F 10/06* (2013.01); *A47G 23/08* (2013.01); *B65G 47/90* (2013.01); *A47J 39/02* (2013.01); *B65G 2201/022* (2013.01)

(58) Field of Classification Search
CPC .. B65G 2201/022; B65G 47/90; B65G 33/06; B65G 1/023; B65G 1/07; B65G 47/5109; A47G 23/08; A47F 10/06; A47J 39/02
USPC .......................................... 198/347.1, 347.2
See application file for complete search history.

(56) References Cited

U.S. PATENT DOCUMENTS

| | | | | |
|---|---|---|---|---|
| 3,033,633 | A | | 1/1960 | Holloway et al. |
| 3,327,655 | A | * | 6/1967 | Mackay .................... B65G 1/07 211/59.3 |
| 3,738,722 | A | * | 6/1973 | Kooiman ................. B65G 1/07 211/59.3 |
| 4,077,528 | A | * | 3/1978 | Santen .................... B65G 33/06 34/189 |
| 4,950,120 | A | * | 8/1990 | Barnes ................. H01R 43/205 221/75 |

(Continued)

FOREIGN PATENT DOCUMENTS

| | | |
|---|---|---|
| CN | 107598937 | 1/2018 |
| CN | 109849007 | 6/2019 |

(Continued)

*Primary Examiner* — James R Bidwell
(74) *Attorney, Agent, or Firm* — Larson & Larson; Frank Liebenow; Justin P. Miller

(57) ABSTRACT

A plate delivery system provides storage for plates in a first-in, last-out configuration. As the kitchen staff completes a meal (plated), the plate is presented to a staging area of the plate delivery system. The plate is moved into a storage area to be ready for the next plate at the staging area. After a number of plates are stored, the plate delivery system relocates from the kitchen to the eating area (e.g., restaurant table or banquet table) and each plate is sequentially presented by a delivery mechanism (e.g., telescoping arms, a robot, or a waitperson) for delivery to the table. In some embodiments, the plate delivery system is enclosed and has a cover mechanism. In some embodiments, the plate delivery system has telescoping arms with fingers for moving the plate from the staging area to the table.

20 Claims, 19 Drawing Sheets

(56) References Cited

U.S. PATENT DOCUMENTS

| | | | | |
|---|---|---|---|---|
| 4,954,760 A | * | 9/1990 | Futch | A47F 1/06 |
| | | | | 211/59.3 |
| 5,064,093 A | | 11/1991 | Davis et al. | |
| 5,199,600 A | * | 4/1993 | Fietsam | B65G 1/07 |
| | | | | 221/244 |
| 5,322,171 A | * | 6/1994 | Pingelton | B65G 1/07 |
| | | | | 211/59.3 |
| 5,473,978 A | | 12/1995 | Colombo | |
| 6,035,973 A | | 3/2000 | Neal et al. | |

FOREIGN PATENT DOCUMENTS

| | | |
|---|---|---|
| FR | 3008671 | 7/2015 |
| JP | 2006158649 | 5/2010 |

\* cited by examiner

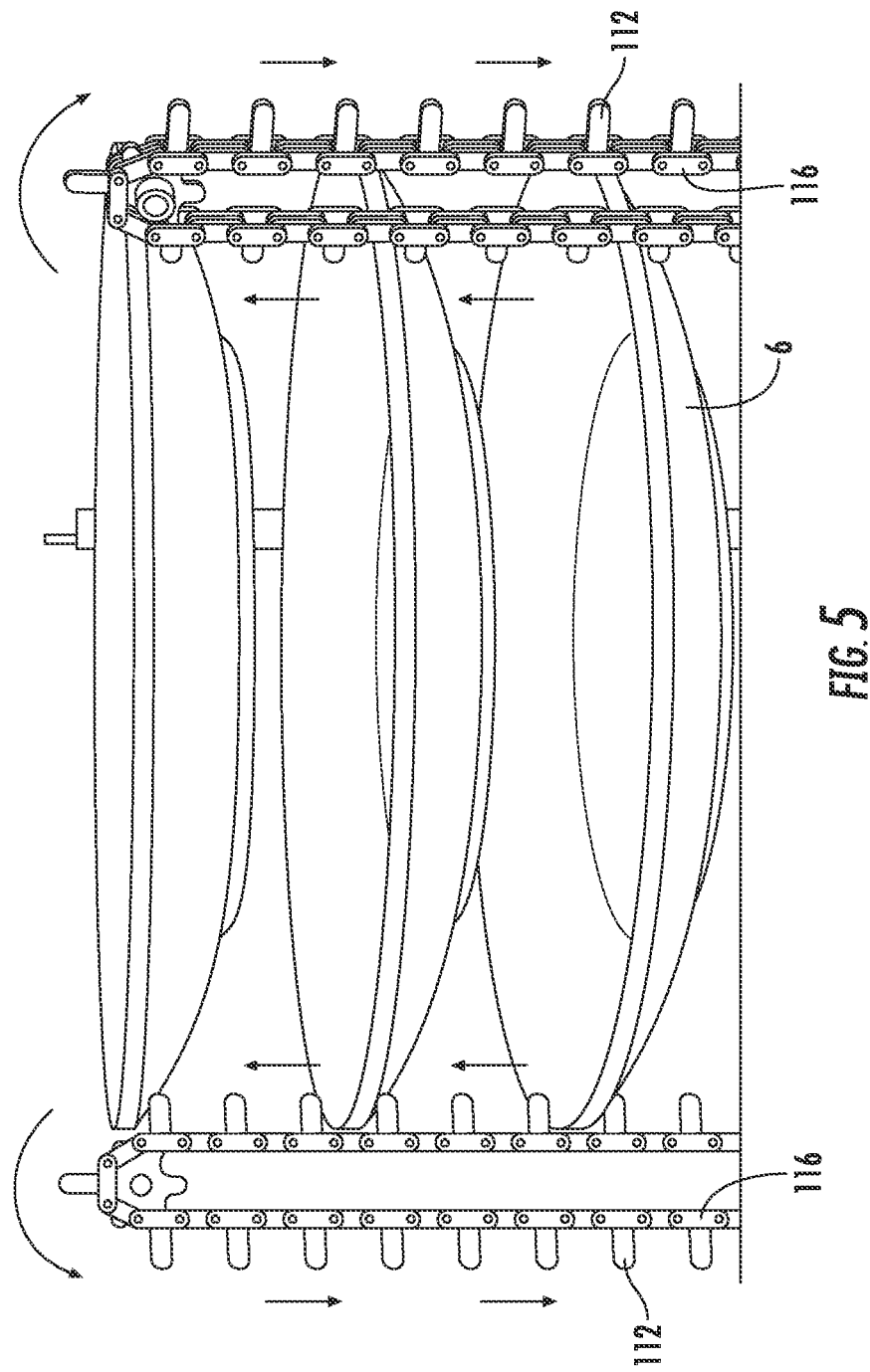

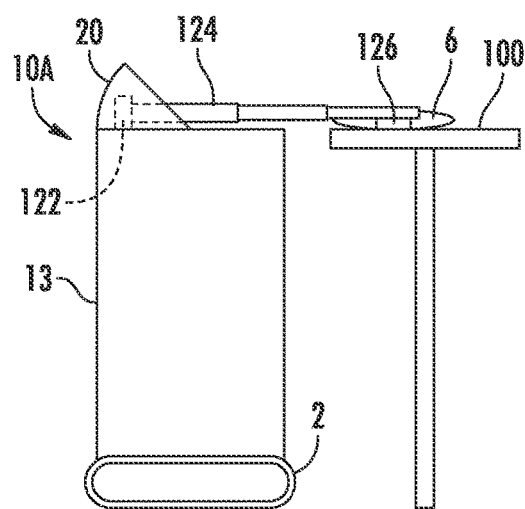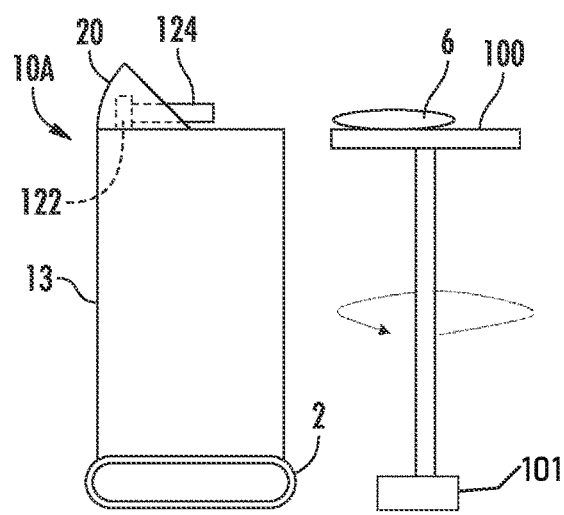

SYSTEM, METHOD, AND APPARATUS FOR ACCEPTANCE AND DELIVERY OF FLAT OBJECTS

CROSS-REFERENCE TO RELATED APPLICATION

This application is a continuation of U.S. patent application Ser. No. 17/401,395, filed Aug. 13, 2021, now U.S. Pat. No. 11,350,780 issued Jun. 7, 2022, the disclosure of which is hereby incorporated by reference.

FIELD

This invention relates to the field of robotics and more particularly to a system for storing and retrieving flat objects such as plates, and more particularly, plates having thereon food.

BACKGROUND

As automation progresses, the delivery and placement of plates on tables will eventually be automated, providing fast distribution of plated items (e.g., food that is still hot or cold) to customers of restaurants, banquet halls, wedding receptions, and the like.

Today, the plated food distribution process is predominately manual. The kitchen staff prepare the food and distribute the food onto several plates. For a restaurant, often, the plates are placed on a tray and delivered to an individual table of customers. For a banquet or reception, often the plates are placed into a plate cabinet on wheels, each plate placed onto an individual shelf until the cabinet is full, and the cabinet is wheeled out to a location near the customers and then each plate is manually retrieved from the cabinet and delivered to each customer, one or a few at a time. To keep food warm, often a plastic or metal cover is placed over each plate.

Recent developments have provided a robotic delivery system in which a robot will place each plate at the tables, but there are issues regarding a robotic device retrieving plates. For one, it is difficult to construct a robot that is capable of bending down or reaching up to retrieve plates from the lower or upper shelves of a cabinet. For robotic retrieval, it is preferred that the plates be retrieved from a height that is similar to table height so that the robot does not need to be designed with an elevator or bending mechanism. Second, keeping food at the proper serving temperature often requires individual plate covers and it is often difficult to design a robot capable of holding a plate while removing the cover.

Therefore, there is a need for a mechanism that will capture plates from the kitchen staff (e.g., plates having food thereon), store the plates, and present the plates sequentially to a robot for delivery to customers of restaurants and banquet halls. It is desired that the mechanism presents the plates at a height that is compatible with the robot and that the plates are maintained in a proper orientation so that the robot need not have to rotate the plate during the serving operation. It is also desirable that the plates (and food) be kept in a sealed environment until presented to the robot to keep foreign matter away from the food and, in some cases, it is desirable to provide temperature control to the plates/food, keeping warm food warm or cool food cool.

What is needed is a system that will sequentially deliver plates to a robot at a location near customers of a restaurant or banquet hall.

SUMMARY

The plate delivery system provides storage for plates in a first-in, last-out configuration. As the kitchen staff completes a meal (plated), the plate holding the meal is presented to the plate delivery system and the plate moves into the plate delivery system to be ready for the next plate. After a number of plates are stored in the plate delivery system, the plate delivery system is transported from the kitchen to the eating area (e.g., restaurant table or banquet table) and each plate is sequentially presented to a delivery mechanism or person (e.g., a robot or a waitperson) for final delivery to the table. In some embodiments, the plate delivery system is enclosed and has a cover mechanism to prevent food contamination by foreign matter and in some embodiments, the plate delivery system has heating/cooling mechanisms to help keep warm food warm or cool food cool.

In one embodiment, a system is disclosed including a mechanism for acceptance and delivery of flat objects (e.g., plates having food thereon). In such, a system for acceptance and delivery of plates includes a staging area into which the plate is accepted or delivered. There is a mechanism for moving the plates from the staging area into a storage area and then moving the plates from the storage area into the staging area in a last-in, first-out sequence. The mechanism for moving the plates is driven by one or more electric motors. The mechanism for moving the plates returns the plates to the staging area from the storage area in a same rotational position as the plate was accepted (e.g., the position of items on the plate matches the position when the plate was first accepted into the staging area).

In another embodiment, a method of accepting and delivering plates from/to a staging area is disclosed including accepting the plates. For each plate accepted, receiving the plate in the staging area then moving the plate into a storage area, thereby maintaining a last-in, first-out order of the plates in the storage area. Then, when delivering the plates to a destination location, moving one of the plates to the staging area and lifting the one of the plates by fingers affixed to telescoping arms, rotating the telescoping arms in a first, lifting rotational direction, then extending the telescoping arms to extend the plate to the destination location, then rotating the telescoping arms in a releasing direction to deposit the plate at the destination location.

In another embodiment, a system for acceptance and delivery of plates is disclosed including a staging area into which the plate is accepted or delivered one at a time. A mechanism is configured to move a plate from the staging area into a storage area and is also configured to move a last plate that was put in the storage area to the staging area. There are two telescoping delivery arms mechanically interfaced to the system for acceptance and delivery of the plates at the staging area. Each telescoping delivery arm has a way to extend and retract and a way to rotate and each telescoping delivery arm terminates with fingers for lifting the plate from the staging area and depositing the plate at a destination location. When the plate is in the staging area, the telescoping delivery arms are rotated to lift the plate, then the telescoping delivery arms are extended to move the plate to the destination location then the telescoping delivery arms are rotated in an opposite direction to deposit the plate at the destination location, and then the telescoping delivery arms are retracted to return the fingers to the staging area.

BRIEF DESCRIPTION OF THE DRAWINGS

The invention can be best understood by those having ordinary skill in the art by reference to the following detailed description when considered in conjunction with the accompanying drawings in which:

FIG. 5 illustrates a schematic view of an alternate mechanism for acceptance and delivery of plates (e.g., plates having food thereon).

FIGS. 14A, 14B, 14C, 14D, 14E, and 14F illustrate schematic views of the alternate mechanism for acceptance and delivery of plates (e.g., plates having food thereon) having an extending arm for placement of the plates on a surface in operation.

DETAILED DESCRIPTION

Figure 1:
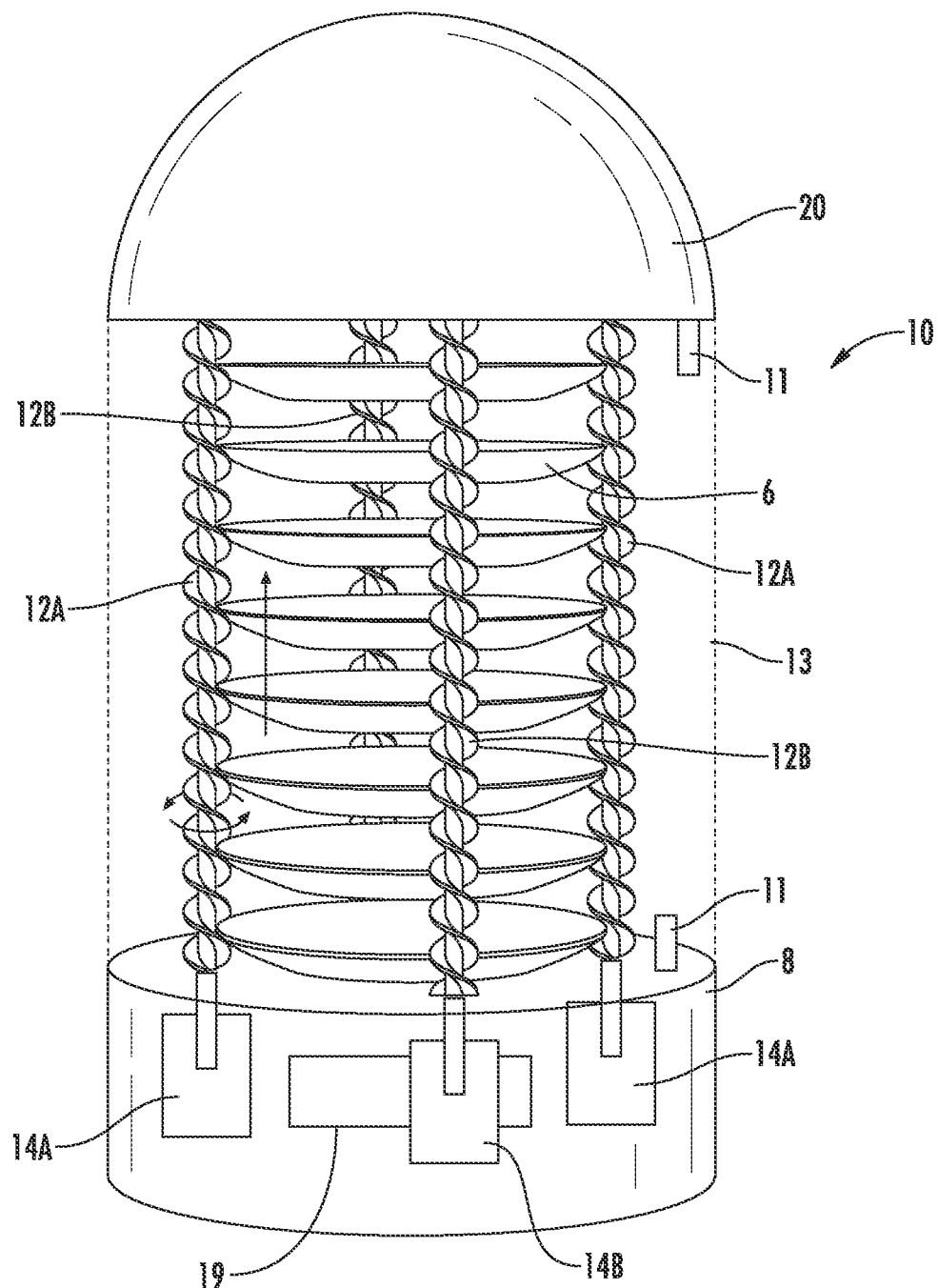
FIG. 1 illustrates a schematic view of a mechanism for acceptance and delivery of plates (e.g., plates having food thereon).

Reference will now be made in detail to the presently preferred embodiments of the invention, examples of which are illustrated in the accompanying drawings. Throughout the following detailed description, the same reference numerals refer to the same elements in all figures.

Throughout this document, the term "plate" is used as a generic term for an object having a surface for holding food and, such is used as an example of such objects as it is well known to hold food in/on bowls or other similar shaped objects. Note that although the exemplary plates are shown as disc-shaped, other shapes are equally anticipated such as hexagonal or square plates.

Referring to FIG. 1, a first embodiment of the delivery mechanism 10 for acceptance and delivery of plates 6 (e.g., plates having food thereon) is shown. In this embodiment, a plurality of spiral shafts 12A/12B are spaced to hold plates 6 therebetween and are configured to turn by way of one or more motors 14A/14B. As the spiral shafts 12A/12B turn, any plates positioned between the spiral shafts 12A/12B traverse the spirals, moving up or down depending upon a direction of rotation of the spiral shafts 12A/12B. Although any number of spiral shafts 12A/12B are anticipated, the embodiment of FIG. 1 shows four spiral shafts 12A/12B. In some embodiments, a first subset of the spiral shafts 12A/12B rotate in one direction (first rotational spiral shafts 12A/12B) and a second subset of the spiral shafts 12A/12B rotate in the opposing direction (second rotational spiral shafts 12A/12B). In such embodiments, counteracting frictional forces between the spiral shafts 12A/12B and the plates 6 help keep the plates 6 position in the same orientation as when the plates 6 were introduced into the delivery mechanism 10 for acceptance and delivery of plates 6.

As many plates 6 have a desired placement orientation (e.g., main entrée closest to the patron, vegetables further away), it is sometimes preferred that the kitchen staff load the plates 6 in a certain direction so that when each plate 6 is presented to the robot 90 (see FIGS. 4A-4D), the plate 6 is in the correct orientation for placement on the table. If all of the spiral shafts 12A/12B rotate in one direction, friction between the spirals will cause the plates 6 to change orientation as they are lowered or raised, possibly requiring reorientation by the robot 90. Therefore, in some embodiments, a first subset of the spiral shafts 12A/12B rotate in one direction (first rotational spiral shafts 12A) and a second subset of the spiral shafts 12A/12B rotate in the opposing direction (second rotational spiral shafts 12B) applying somewhat equal frictional rotational force in opposing directions to prevent rotation of the plates 6.

In some embodiments, each spiral shaft 12A/12B has a dedicated motor 14A/14B (e.g., a servo motor or similar) while in some embodiments, a single motor 14A is rotationally coupled to all of the spiral shafts 12A/12B through gears, pulleys, belts, serpentine belts, or any known rotational coupling mechanism. It is also known that such rotational coupling mechanism is fully capable of providing one direction of rotation to the first rotational shafts 12A and an opposite direction of rotation to the second rotational shafts 12B. There is no requirement that the spiral shafts 12A/12B that are located opposite each other rotate in the same direction. For example, in some embodiments, a first two spiral shafts 12A are adjacent to each other and a second two spiral shafts 12B are adjacent to each other and opposite to the first two spiral shafts 12A. More than four spiral shafts 12A/12B are also anticipated.

Figure 15:
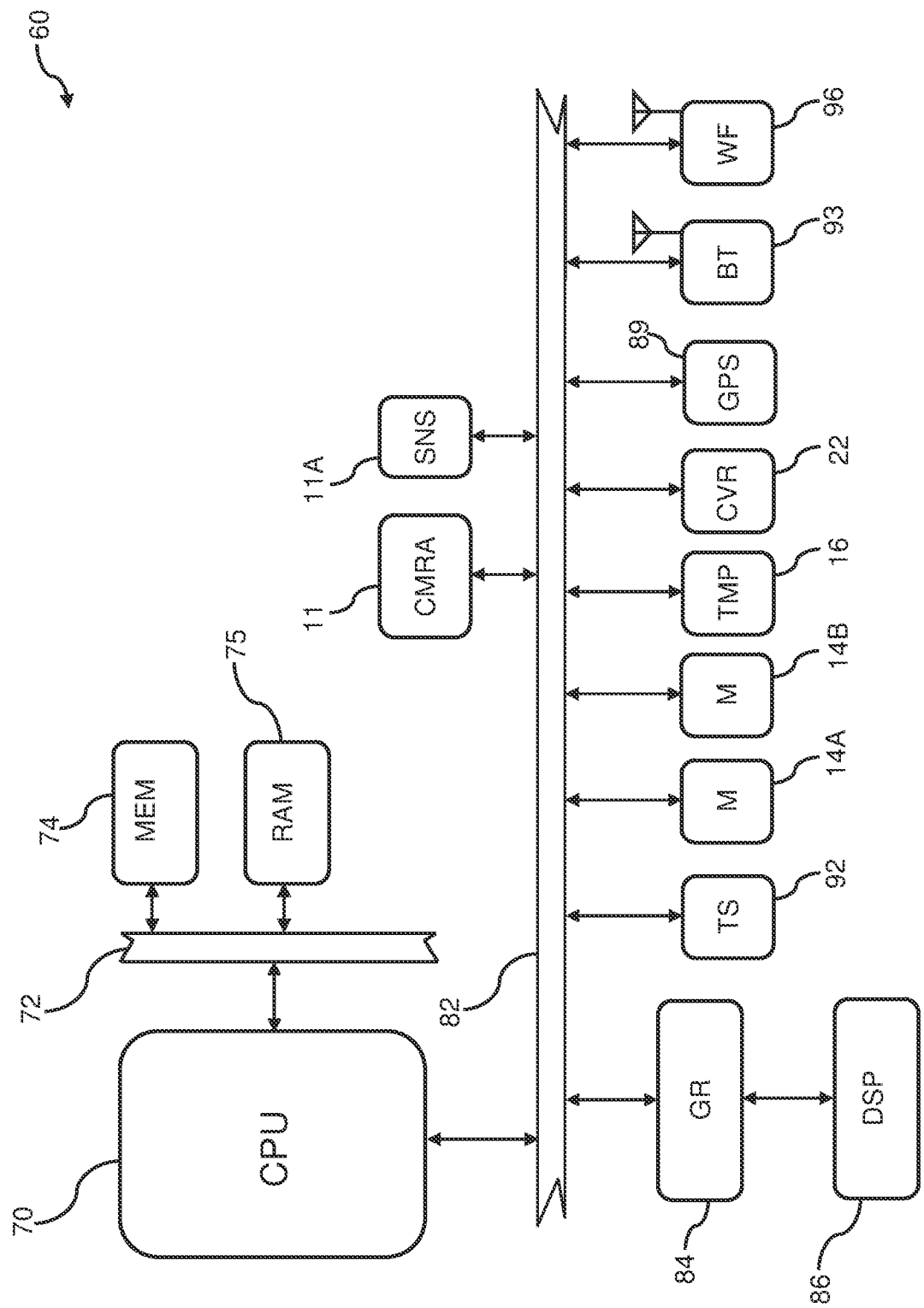
FIG. 15 illustrates a schematic view of a control system for the mechanism for acceptance and delivery of plates.

In some embodiments, rotation of the rotational shafts 12A/12B is controlled by a processor 70 (see FIG. 15). In such, the processor 70 receives a signal to accept a plate 6 and initiates rotation of the rotational shafts 12A/12B in a first direction (or set of directions) to move the plate 6 into the delivery mechanism 10, e.g., by providing power to one or more motors 14A/14B. The plate 6 is then placed into the staging area (upper most position), for example, by kitchen staff.

Later, when the processor receives a signal to present a plate 6, the top plate 6 is removed then the processor initiates rotation of the rotational shafts 12A/12B in an opposite direction (or set of directions), e.g., by providing an opposite polarity power to one or more motors 14A/14B. This moves the plate 6 to the plate staging area (top position) for removal by the robot 90 (or by a person). In some embodiments, the processor is programmed with an inter-plate spacing (e.g., depending upon the height of the plate plus the maximum height of the food resting on the plates 6) and the processor rotates the directional shafts 12A/12B a number of turns that will move each plate by that inter-plate spacing. In some embodiments, sensors 11 are provided and the processor 70 reads and interprets data from the sensors 11 to determine positions and travel of the plates 6, knowing how far to move the plates 6 depending upon the height of the plate 6 just added or the proximity of the next plate 6 to the staging area (top position). Examples of such sensors 11 include cameras, photodetectors, and/or ultrasonic devices that use reflected ultrasonic sound to determine position and location of each plate 6.

Note that although a processor 70 is shown in the above examples, it is known in the industry to implement some or all of this functionality in logic instead of using a processor.

In some embodiments, the delivery mechanism 10 is enclosed in an enclosure 13 and has a cover 20 that protects food from contamination until the food reaches its destination (e.g., the table area). In the embodiment shown in FIG. 1, the cover 20 is multipart 24A/24B/24D as in FIGS. 2A/2B/2C and opens by way of a cover motor 22 controlled by the processor 70 or by a dedicated switch. In some embodiments, the cover 20 is opened/closed manually.

In some embodiments, again, the delivery mechanism 10 is enclosed in an enclosure 13 and includes a heater/chiller 19. The heater/chiller 19 heats or cools the area within the enclosure 13 depending upon whether the food on the plates 6 is warm food (e.g., a hot entrée) or cool food (e/g., a cold food like ice cream). The heater/chiller 19 is either independently settable by, for example, a temperature setting or controlled by the processor 70.

Although the delivery mechanism 10 is shown loading plates 6 in a downward direction from the plate staging area (top location), it is also anticipated to load plates 6 in an upward direction (e.g., loading the plates 6 into an area above the plate staging area) or both (e.g., alternately loading the plates 6 in an area above then an area below the plate staging area).

Although not shown, any of the delivery mechanism 10 embodiments are anticipated to be mounted on three or more wheels and, in some embodiments, the wheels are motor driven under control of the processor 70 to move the delivery mechanism 10 (e.g., from the kitchen to the dining area and back). In such, it is also anticipated that a positioning system be interfaced to the processor 70 (e.g., a global position satellite receiver) so that the processor 70 is aware of the location of the delivery mechanism 10.

Figure 2A:
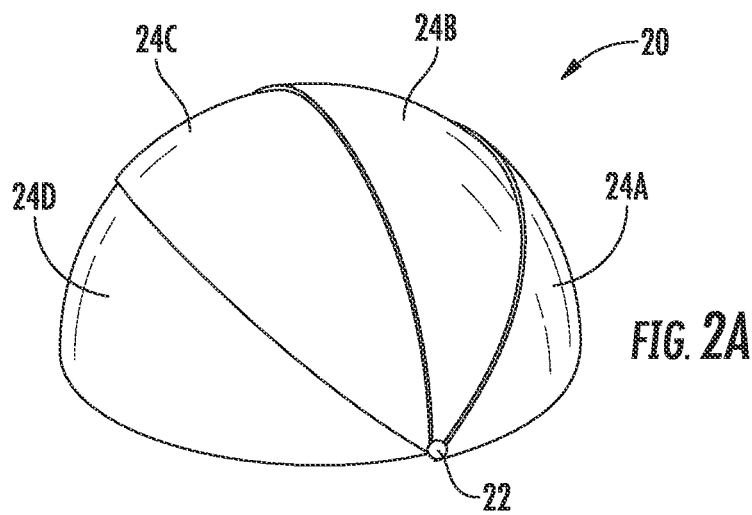
FIGS. 2A, 2B, and 2C illustrate perspective views of the multi-part cover of the mechanism for acceptance and delivery of plates.
Figure 2B:
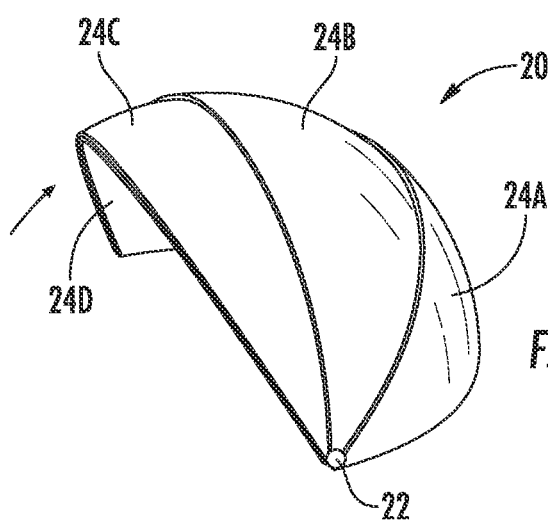
Figure 2C:
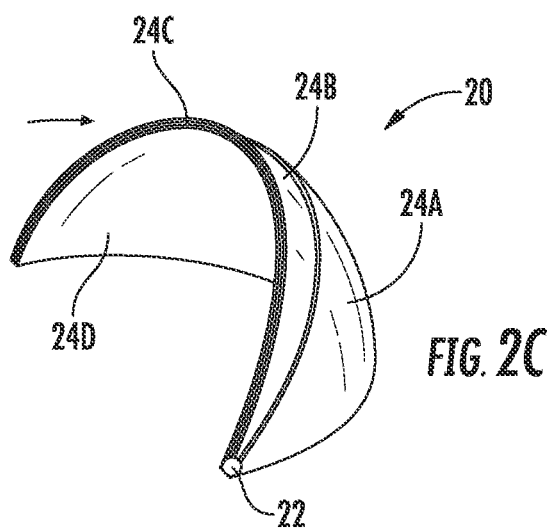

FIGS. 2A, 2B, and 2C illustrate perspective views of an exemplary cover system 20 the delivery mechanism 10 for acceptance and delivery of plates 6 is shown. In some embodiments in which the delivery mechanism 10 is enclosed in an enclosure 13, a cover 20 is provided to protect food from contamination until the food reaches its destination (e.g., the table area). In the exemplary embodiment shown in FIGS. 2A/2B/2C, the cover 20 is multipart 24A/24B/24D and opens by way of a cover motor 22 controlled by the processor 70 or by a dedicated switch. In some embodiments, the cover 20 is opened/closed manually. FIG. 2A shows the cover 20 in the closed position, FIG. 2B shows the cover 20 partially open, and FIG. 2C shows the cover 20 open, allowing plates 6 to be placed/removed into/from the staging area.

Figure 3:
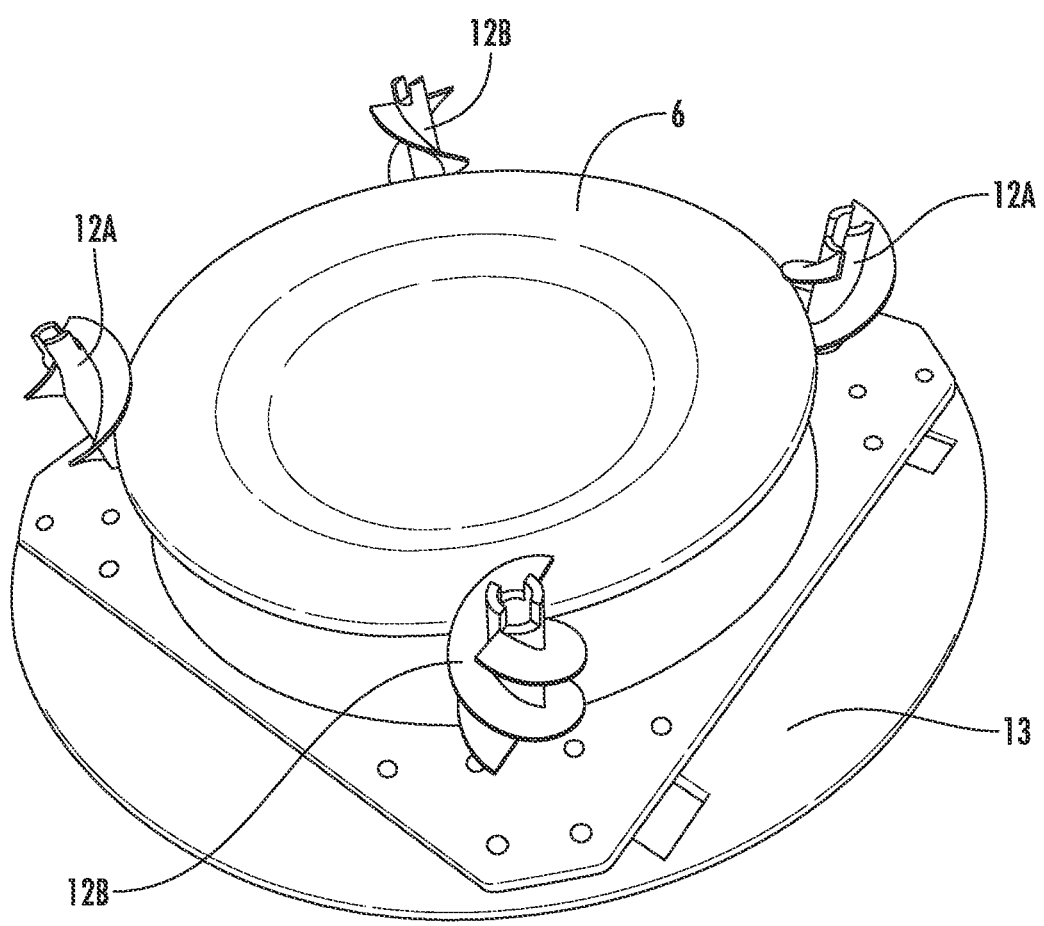
FIG. 3 illustrates a perspective view of the flat object delivery mechanism of the mechanism for acceptance and delivery of plates of FIG. 1.

Referring to FIG. 3, a perspective view of the delivery mechanism 10 for acceptance and delivery of plates 6 of FIG. 1. In this example, it is shown how two spiral shafts 12A spiral in one direction of spiraling and the other two spiral shafts 12B spiral in the opposite direction of spiraling to reduce plate rotation during turning. Note that there is no requirement that the two spiral shafts 12A be on opposite sides of the plate 6, as it is possible that the two spiral shafts 12A be next to each other and the other two spiral shafts 12B also be next to each other.

Figure 4B:
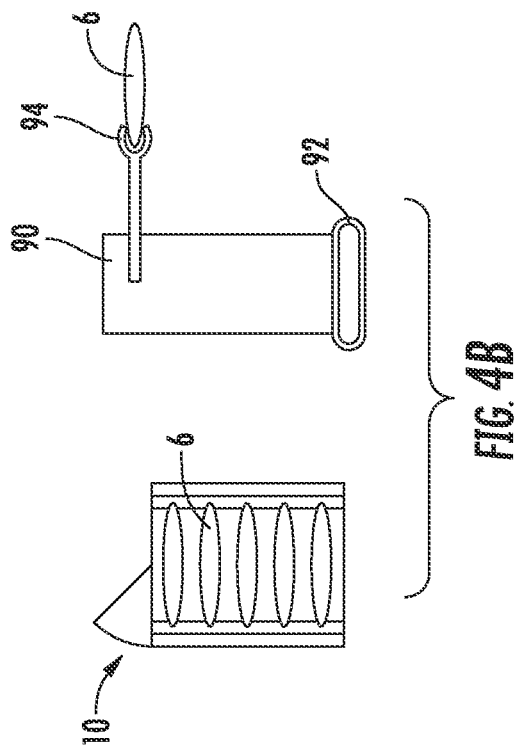
FIGS. 4A, 4B, 4C, and 4D illustrate plan views of the mechanism for acceptance and delivery of plates.
Figure 4D:
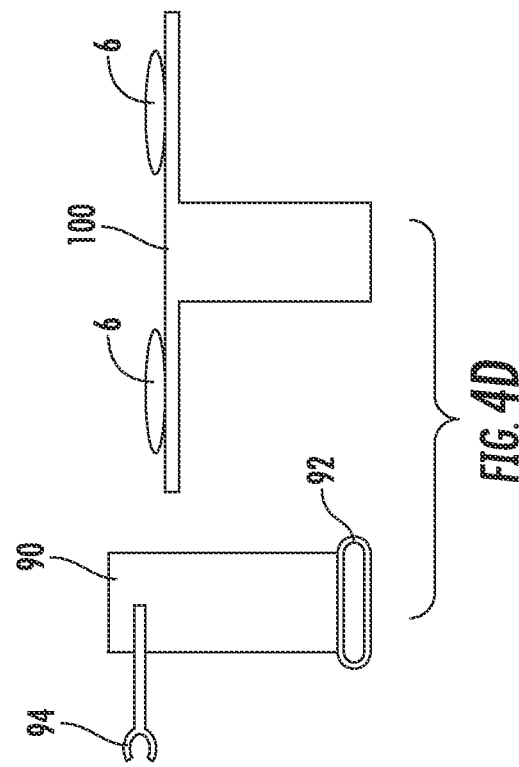
Figure 4A:
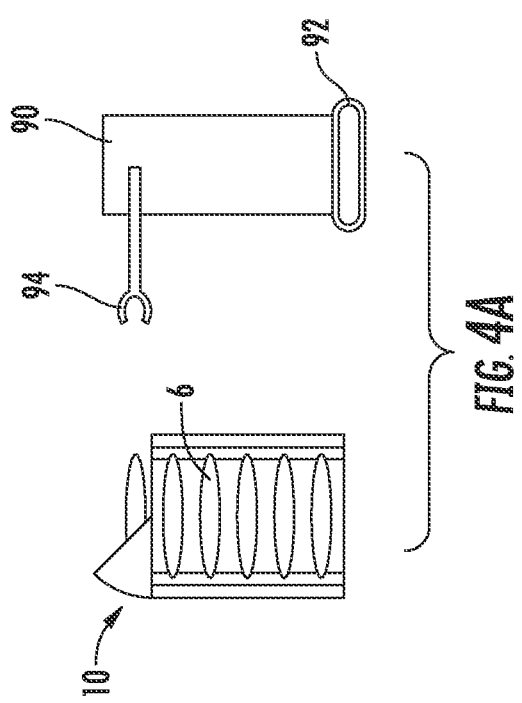

Referring to FIGS. 4A, 4B, 4C, and 4D, plan views of the delivery mechanism 10 in use by a robot 90 are shown. In FIG. 4A, the robot 90 approaches the delivery mechanism 10 and a grip mechanism 94 of the robot 90 removes a top plate 6 as shown in FIG. 4B. Note that in FIG. 4B, the next plate 6 has not yet been moved up to the staging area.

Figure 4C:
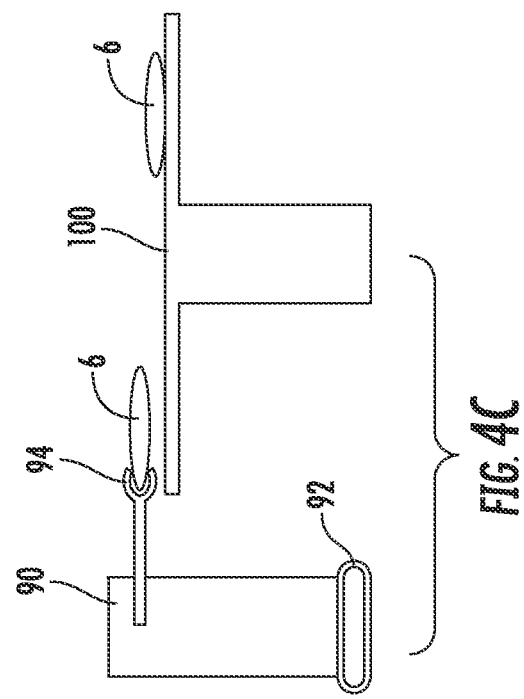

In FIG. 4C, the robot 90 moves to a placement area of a delivery surface 100 (e.g., a destination location, a table, counter, or any target surface) by way of a robot motion device 92 (e.g., motorized wheels, treads, etc.), and leaves the plate 6 on the table as shown in FIG. 4D. The robot 90 then moves back to retrieve the next plate 6.

Referring to FIG. 5, a schematic view of an alternate plate delivery mechanism for acceptance and delivery of flat objects (e.g., plates having food thereon) is shown. In this mechanism, a plurality of chains 116 having teeth 112 on which the plates rest provides for the movement of the plates to/from the staging area. The chain 116 is driven by a sprocket turning in one direction to raise and deliver the plates 6 and turning in an opposing direction to lower and accept the plates 6. Note as with all embodiments, it is anticipated that plates be loaded from the top of the plate delivery mechanism (as shown), from the bottom of the plate delivery mechanism, or both if there is an upper and a lower plate delivery mechanism.

Figure 6:
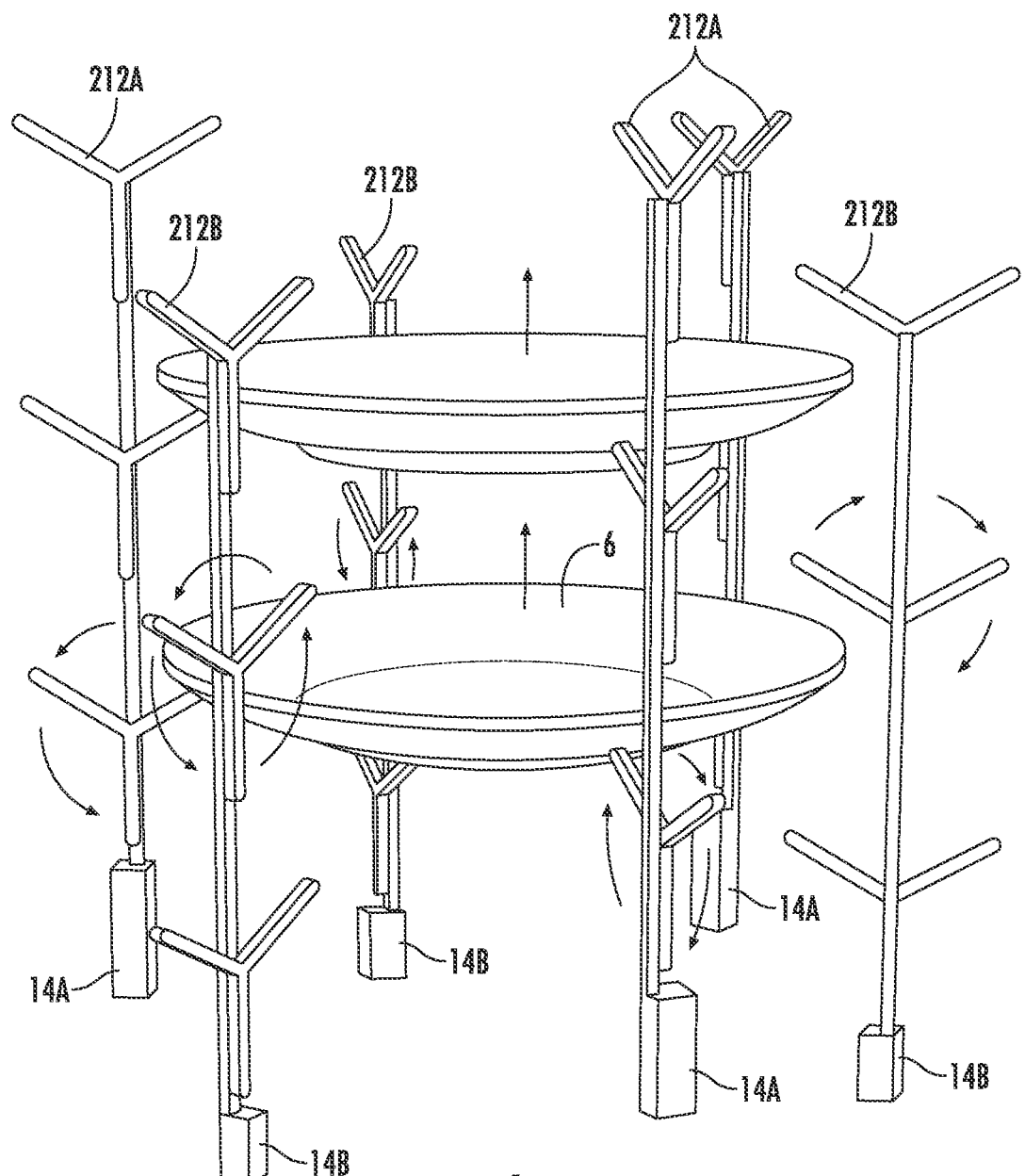
FIG. 6 illustrates a schematic view of an alternate mechanism for acceptance and delivery of plates (e.g., plates having food thereon).

Referring to FIG. 6, a schematic view of an alternate plate delivery mechanism for acceptance and delivery of flat objects (e.g., plates having food thereon) is shown. In this mechanism, a plurality of propellers 212A/212B rotate as controlled by motors 14A14B (note that although referred to as propellers 212A/212B, there is no function of moving air and, therefore, no requirement for angular surfaces as a propeller of an airplane). The plates rest on the propellers 212A/212B and are dropped down or lifted up to the next set of propellers 212A/212B by rotation of the propeller 212A/212B on which the plate 6 currently rests. The propellers 212A/212B are rotated in one direction to raise and deliver the plates 6 and the propellers 212A/212B are rotated in an opposing direction to lower and accept the plates 6.

Note as with all embodiments, it is anticipated that plates be loaded from the top of the plate delivery mechanism (as shown), from the bottom of the plate delivery mechanism, or both if there is an upper and a lower plate delivery mechanism.

Figure 7:
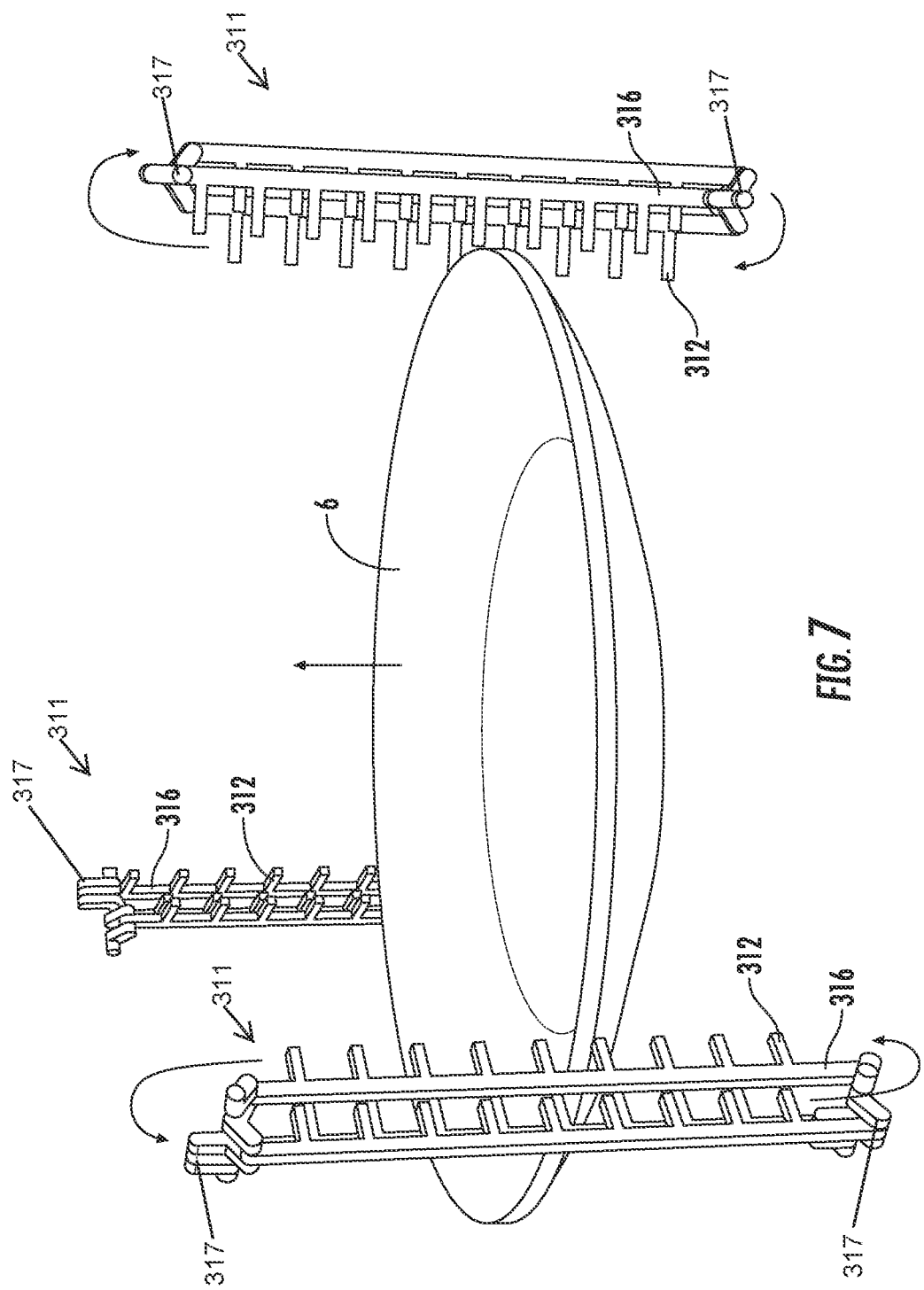
FIG. 7 illustrates a schematic view of an alternate mechanism for acceptance and delivery of plates (e.g., plates having food thereon).

Referring to FIG. 7, a schematic view of another alternate plate delivery mechanism for acceptance and delivery of flat objects (e.g., plates having food thereon) is shown. In this mechanism, a plurality of pairs 311 of elongated shafts 316 (three pairs are shown) have teeth 312 on which the plates 6 rest. The plates rest on the teeth 312 a first elongated shaft 316 and are moved up/down by lifting/lowering the first elongated shafts 316 by rockers 317. After the rockers 317 extend the first elongated shaft 316 to the upper/lower limit of travel, a second elongated shaft 316 of the pair 311 is now at the lower/upper limit of travel and the pair is pivoted such that the teeth 312 of the second elongated shaft 316 of the pair 311 is now engaged with the plate 6 and the teeth 312 a first elongated shaft 316 are no longer engaged with the plate 6. Now the rockers 317 are operated in reverse, further moving the plate 6 in the desired direction, and then the pair 311 is pivoted such that the teeth 312 of the first elongated shaft 316 of the pair 311 is now engaged with the plate 6, repeating until the plate 6 is in the desired position.

Figure 8:
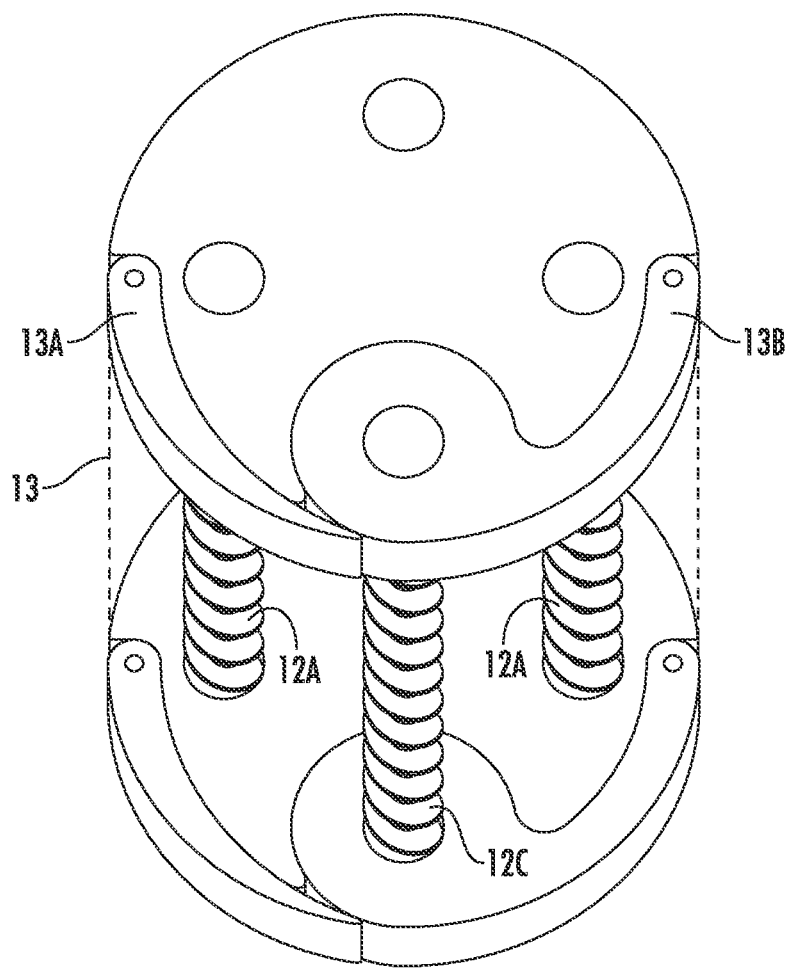
FIGS. 8 and 9 illustrate perspective views of an alternate mechanism for out-of-order acceptance and delivery of plates (e.g., plates having food thereon).
Figure 9:
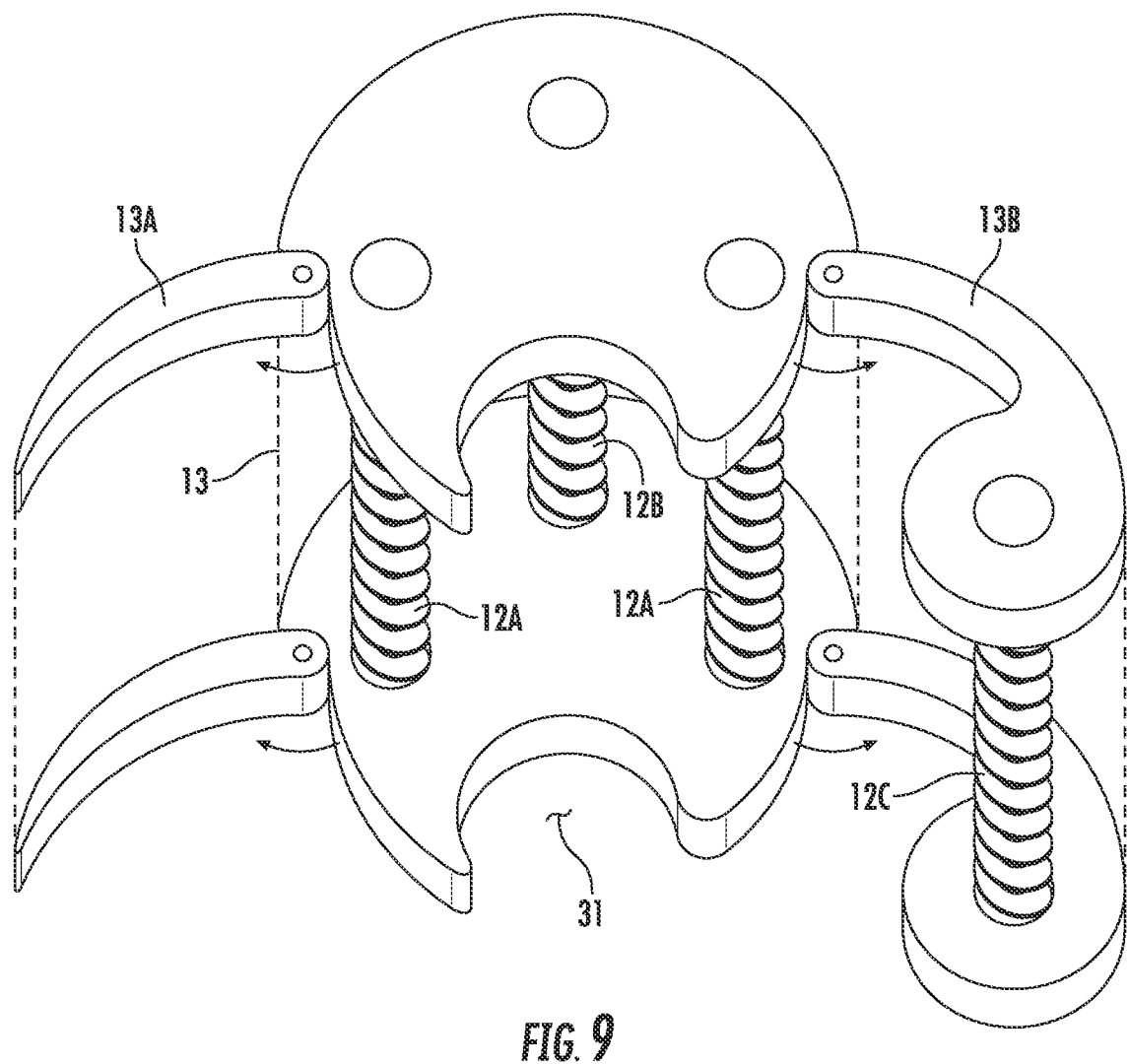

Referring to FIGS. 8 and 9, perspective views of a plate delivery mechanism 10 with out-of-order acceptance and delivery of plates 6 (e.g., plates having food thereon) are shown.

In some applications of the plate delivery mechanism 10, there exists a need to accept the plates 6 in a random order, for example, when each patron is able to select a meal from a menu (e.g., chicken, beef, or fish). In such, it is possible that one type of meal is ready to be plated before another type of meal. To accommodate such, the plate delivery mechanism 10 with out-of-order acceptance and delivery of plates 6 has a door mechanism 13A/13B that hingedly opens. In this example, a captured spiral shafts 12C is integrated into one door of the door mechanism 13A/13B such that, as shown in FIG. 9, when the door mechanism 13A/13B is in the open configuration, the captured spiral shaft 12C moves away from the plate holding area. Any plates that are held between the spiral shafts 12A/12B/12C remain in place when the captured spiral shaft 12C swings out with the door mechanism 13A/13B by virtue of the points of contact with the spiral shafts 12A/12B. When the door mechanism 13A/13B is in the open configuration, plates 6 (not shown in FIGS. 8 and 9 for clarity reasons) are able to be removed or inserted into the spiral shafts 12A/12B in any relative position (e.g., placing a fish entrée in a top position and a beef entrée in a next position, etc.). After random placement of plates 6 in the plate delivery mechanism 10 with out-of-order acceptance and delivery, the door mechanism 13A/13B is moved to the closed position (as shown in FIG. 8) and the plate delivery mechanism 10 with out-of-order acceptance and delivery is relocated for delivery to the delivery surface 100. Note that it is anticipated that once near the delivery surface 100, the plates 6 be delivered either at the staging area or randomly by opening the door mechanism 13A/13B.

Referring to FIGS. 10, 11, 12, and 13, perspective views of an integrated delivery mechanism 10A for acceptance and delivery of plates 6 (e.g., plates having food thereon) having a delivery mechanism 120 for placement of the plates 6 on a delivery surface 100 are shown. In this embodiment, instead of requiring a separate delivery person or robot 90, the integrated delivery mechanism 10A for acceptance and delivery of plates 6 (e.g., plates having food thereon) has delivery arms 124 for transporting the plates 6 from the staging area to the delivery surface 100. In the embodiments shown in FIGS. 10, 11, 12, and 13, the delivery arms 124 have fingers 126 for holding the plate 6 that is to be delivered from the staging area to the delivery surface 100. A first movement mechanism 122A (e.g., servo motors, hydraulic rams, screw drives) extends/retracts the arms 124 (e.g., telescoping). A second movement mechanism 122B (e.g., servo motors, hydraulic rams, screw drives) rotates the delivery arms 124 to engage/disengage the fingers 126.

Figure 10:
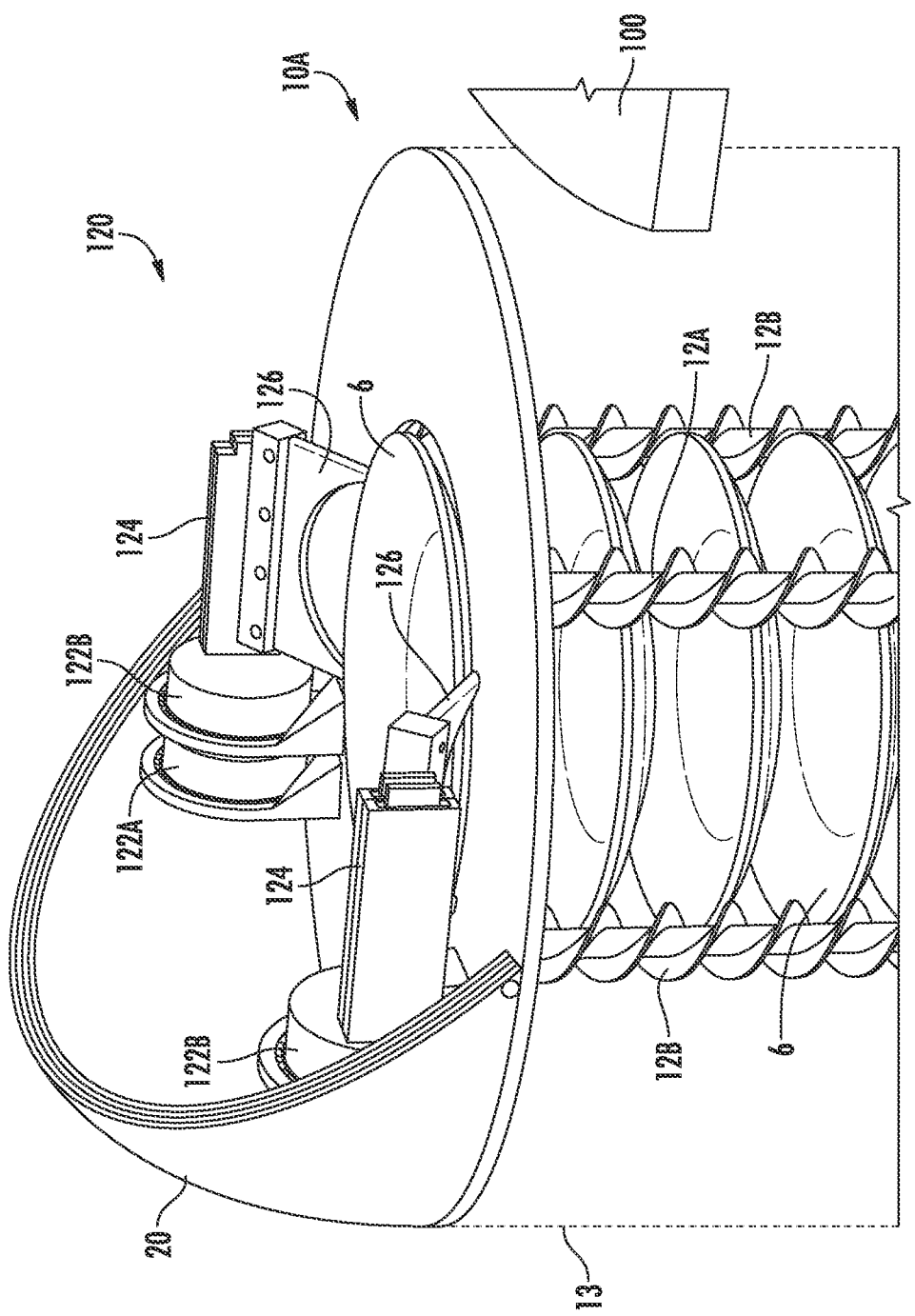
FIGS. 10, 11, 12, and 13 illustrate perspective views of an alternate mechanism for acceptance and delivery of plates (e.g., plates having food thereon) having an extending arm for placement of the plates on a surface.
Figure 11:
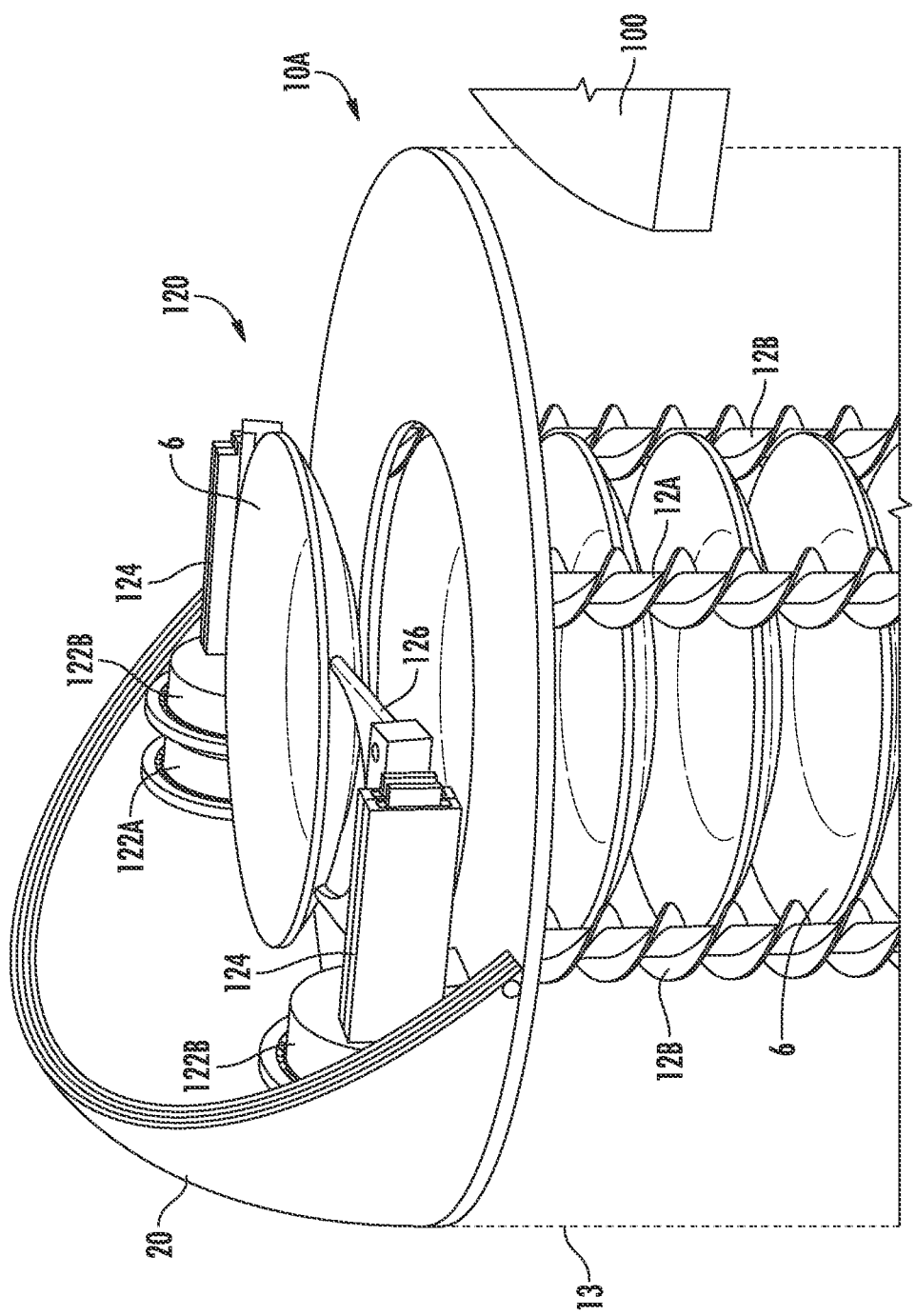
Figure 12:
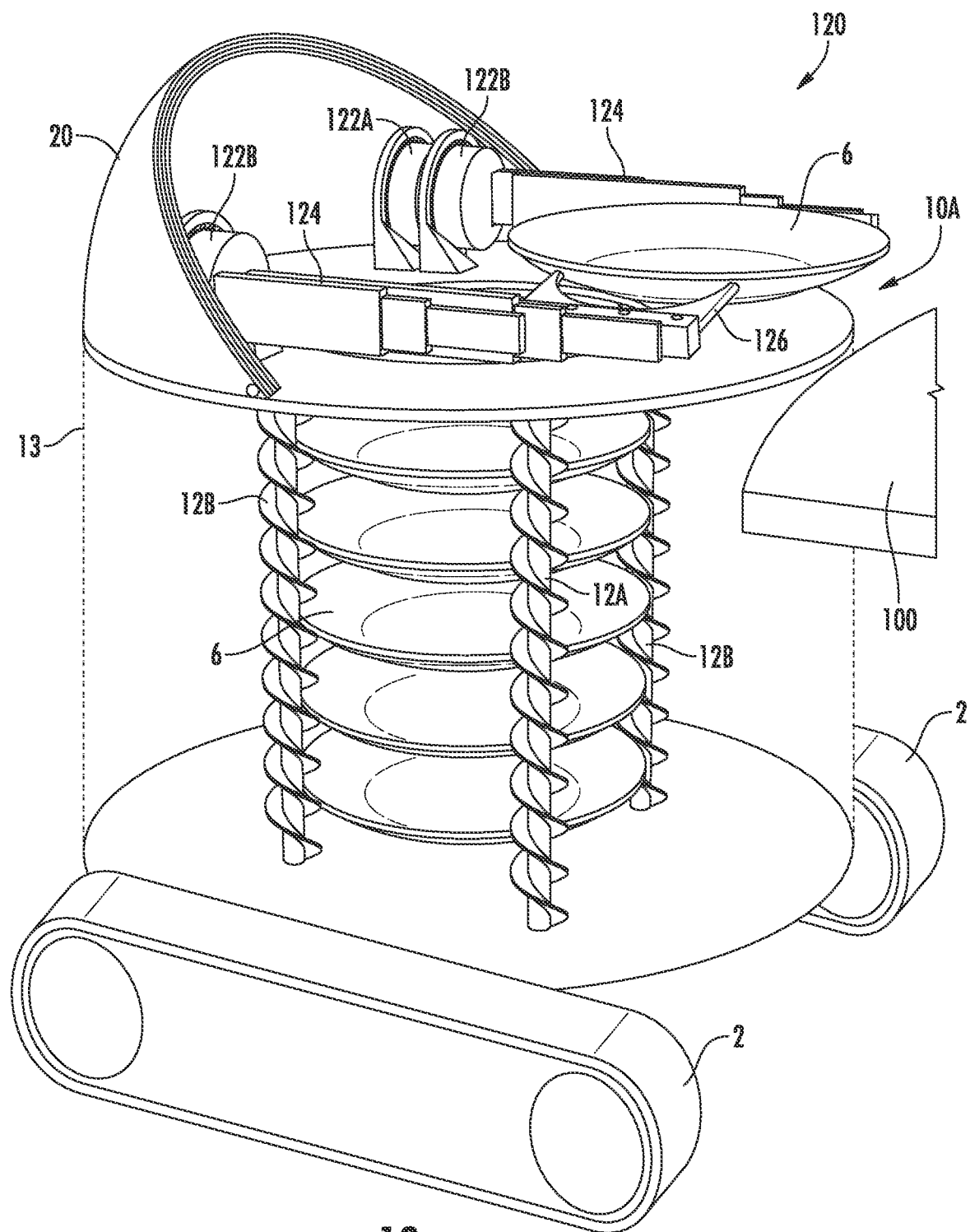
Figure 13:
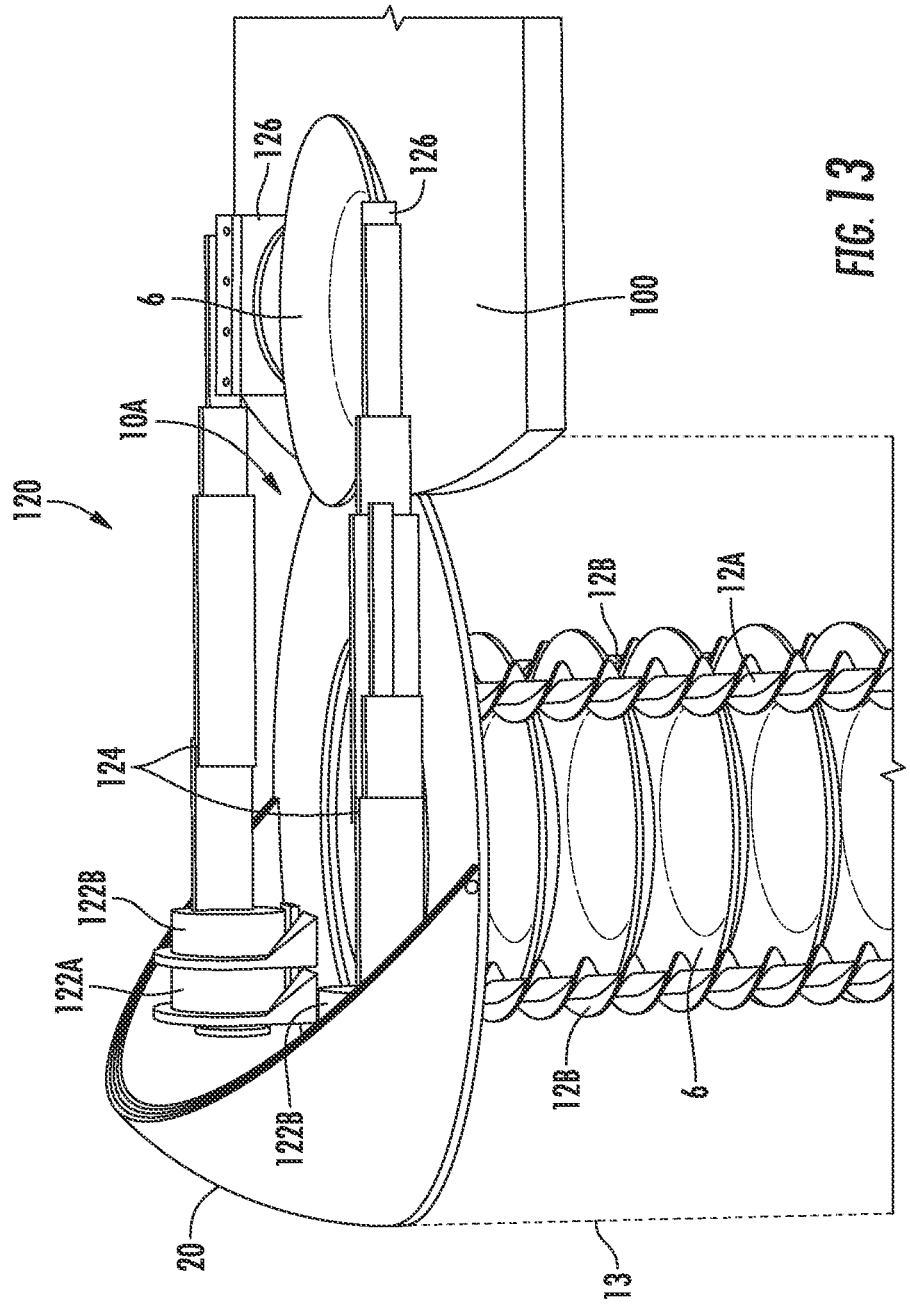

In FIG. 10, the delivery arms 124 are retracted and the fingers 126 are rotated away from the plate 6, allowing the plate 6 to be moved into the staging area. Once in the staging area, the delivery arms 124 are rotated by the second movement mechanism 122B to lift the plate 6 by the fingers 126 to a position above the staging area as shown in FIG. 11. Now the first movement mechanism 122A is operated to extend the arms 124 and relocate the plate 6 forward, and away from the staging area until the plate 6 is over the surface 100 where the plate 6 is to be placed. Once at the surface 100 where the plate 6 is to be placed, the second movement mechanism 122B is operated in an opposite direction to release the plate 6 at the surface.

Now the arms 124 are retracted and the integrated delivery mechanism 10A for acceptance and delivery of plates 6 is relocated by a relocation mechanism 2 (e.g., by motor operated wheels, tracks, etc.) to the next location of the surface 100 where the next plate is to be placed and the above steps are repeated until all plates 6 are placed. Note that any relocation mechanism 2 is anticipated including motor operated wheels (one motor or two motors for providing rotation), tracks, etc. It is also anticipated to have position and navigation sensors such as GPS 89, ultrasonic distance measuring devices for detecting distance to objects such as walls, bumper switches to detect contact with objects, cameras 11, inertial sensors to detect contact with objects, etc.

Figure 14A:
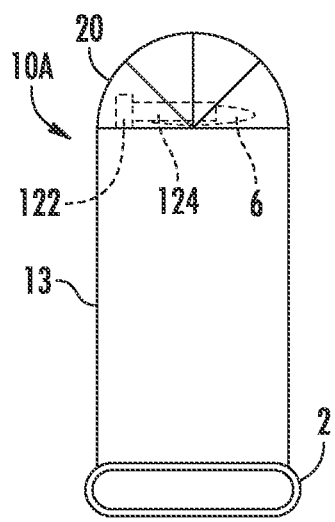
Figure 14B:
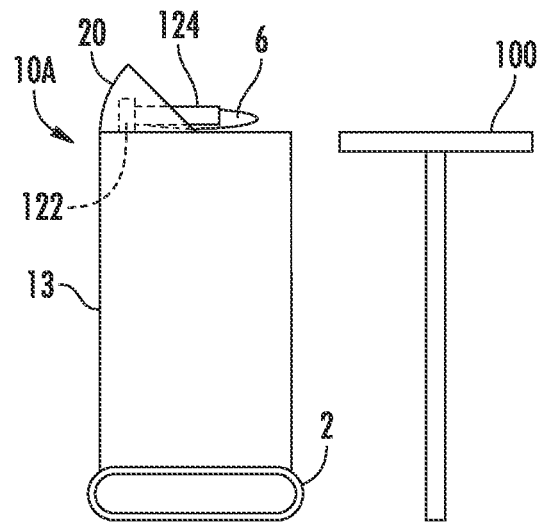
Figure 14C:
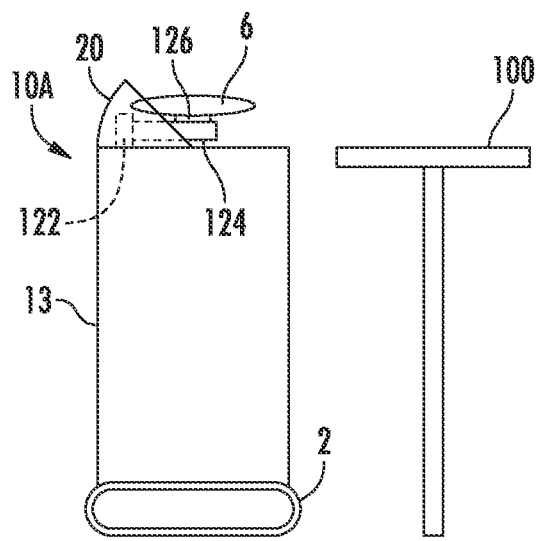
Figure 14D:
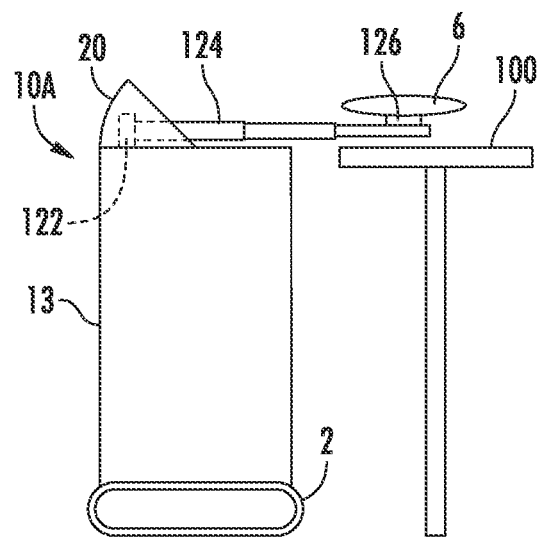

Referring to FIGS. 14A, 14B, 14C, 14D, 14E, and 14F, schematic views of the integrated delivery mechanism 10A for acceptance and delivery of plates 6 (e.g., plates having food thereon) is shown in operation. In FIG. 14A, the integrated delivery mechanism 10A is shown loaded with plates 6 (only a plate 6 at the staging area is visible) and moves by relocation mechanism 2 to the surface 100 where the plate 6 is to be placed. In FIG. 14B, the cover 20 is retracted, exposing the plate 6 at the staging area. In FIG. 14C, the arms 124 are rotated, causing the fingers 126 (not visible) to lift the plate 6. In FIG. 14D, the arms 124 are extending, moving the plate 6 over the surface 100. In FIG. 14E, the arms 124 are rotated in the opposite direction of rotation, dropping the plate 6 onto the surface. Finally, in FIG. 14F, the arms 124 are retracted and the integrated delivery mechanism 10A is ready to stage another plate 6 and relocate to another location on the surface 100 or to a surface 100 that is different (e.g., another table).

Note that in FIG. 14F, a table motor 101 is shown interface to the table 100 such that operation of the table motor 101 rotates the table 100. In some embodiments, the table motor 101 is electrically controlled to rotate the table 100 (e.g., controlled through wires, light, or radio waves) after the plate 6 is placed on the table 100. Thereby, after the arms 124 drop the plate onto the surface of the table 100, the table motor 101 is energized (e.g., by the integrated delivery mechanism 10A) so that the next plate 6 has a place to be deposited without requiring repositioning of the integrated delivery mechanism 10A.

Referring to FIG. 15, a control system 60 for the delivery mechanism 10 for acceptance and delivery of plates 6 is shown. The example control system 60 represents a typical system used for controlling the delivery mechanism 10. This exemplary control system 60 is shown in its simplest form. Different architectures are known that accomplish similar results in a similar fashion and the present invention is not limited in any way to any particular control system 60 architecture or implementation. In this exemplary control system 60, a processor 70 executes or runs programs in a random-access memory 75. The programs are generally stored within a persistent memory 74 and loaded into the random-access memory 75 when needed. The processor 70 is any processor, typically a processor designed for control operations. The persistent memory 74 and random-access memory 75 are connected to the processor for example, by a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, magnetic memory, flash memory, read only memory, battery-backed memory, etc. In some embodiments, the persistent memory 74 is removable, in the form of a memory card of appropriate format such as SD (secure digital) cards, micro-SD cards, compact flash, etc.

Also connected to the processor 70 is a system bus 82 for connecting to peripheral subsystems such as a graphics adapter 84 and a touch screen interface 89. The graphics adapter 84 receives commands from the processor 70 and controls what is depicted on a display 86. The touch screen interface 89 provides navigation and selection features. In some embodiments, illuminating devices (e.g., LEDs) are provided instead of or in addition to the display 86.

In general, some portion of the persistent memory 74 is used to store programs, executable code, and data, etc.

The peripherals are examples and other devices are known in the industry such as a Global Positioning Subsystem 91, speakers, microphones, USB interfaces, Bluetooth transceiver 93, Wi-Fi transceiver 96, sensors 11 (e.g., a camera), other sensors 11A, motors 14A/14B, temperature control 16, the cover motor 22, etc.

For local communications, in some embodiments, the control system 60 includes a Bluetooth transceiver 93, a Wi-Fi transceiver 96, or both. In such embodiments, local communications provide data communications between the control system 60 (e.g., the delivery mechanism 10) and other computer-based devices such as the robots 90 or a central control computer for monitoring delivery progress, scheduling, etc.

Figure 16:
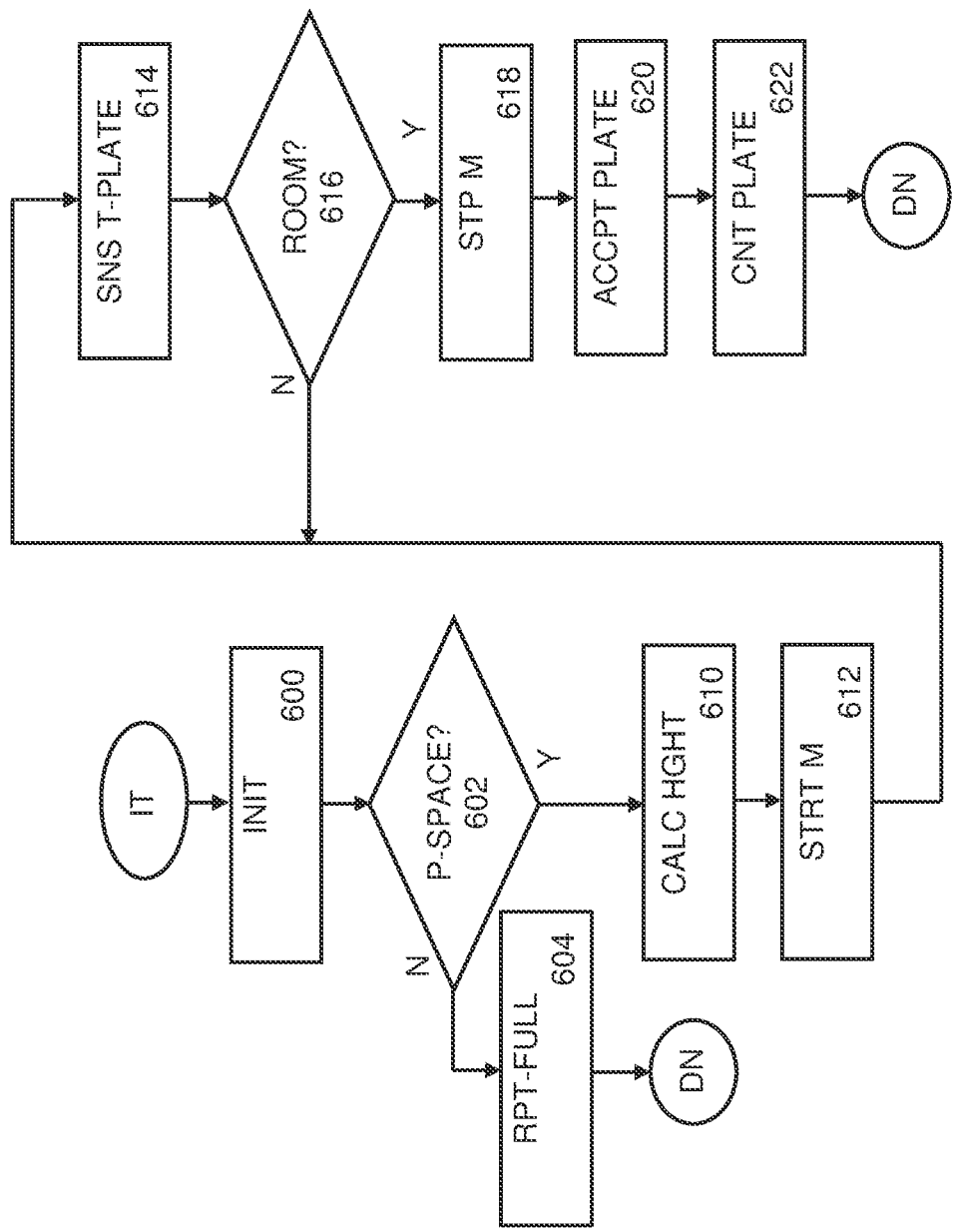
FIG. 16 illustrates a flow chart of an intake operation of the control system for the plate delivery mechanism.

Referring to FIG. 16, a flow chart of an intake operation of the control system 60 for the delivery mechanism 10 is shown.

After initialization 600, a test 602 is made to verify that there is space for a new plate 6. If the test 602 determines that there is no space for the new plate 6, a full status is reported 604 and no plate 6 is accepted.

If the test 602 determines that there is space for the new plate 6, a plate-height calculation 610 is made (e.g., by a pre-set height that is administered or by using the sensors 11 to determine how high is the plate 6 with food on the plate 6. Now, the motor(s) 14A/14B are started 612 to operate in a direction to provide room for the new plate 6 and the location of the top plate 6 is sensed 614 (e.g., using sensors 11/11A) and a plate location test 616 is performed. If the plate location test 616 indicates that the top plate 6 has not moved far enough to accept the new plate 6 without the another plate 6 contacting the food that is on the top plate 6, the top plate 6 is again sensed 614 (e.g., using sensors 11/11A) and the plate location test 616 is again performed (motor(s) 14A/14B are still running) until the plate location test 616 indicates that there is enough room to accommodate the new plate 6, at which time the motor(s) 14A/14B are stopped 618 and the new plate 6 is accepted 620 at the staging area. In some embodiments, a plate count is updated 622, providing data to the processor as to how many plated 6 are stored in the delivery mechanism 10.

Figure 17:
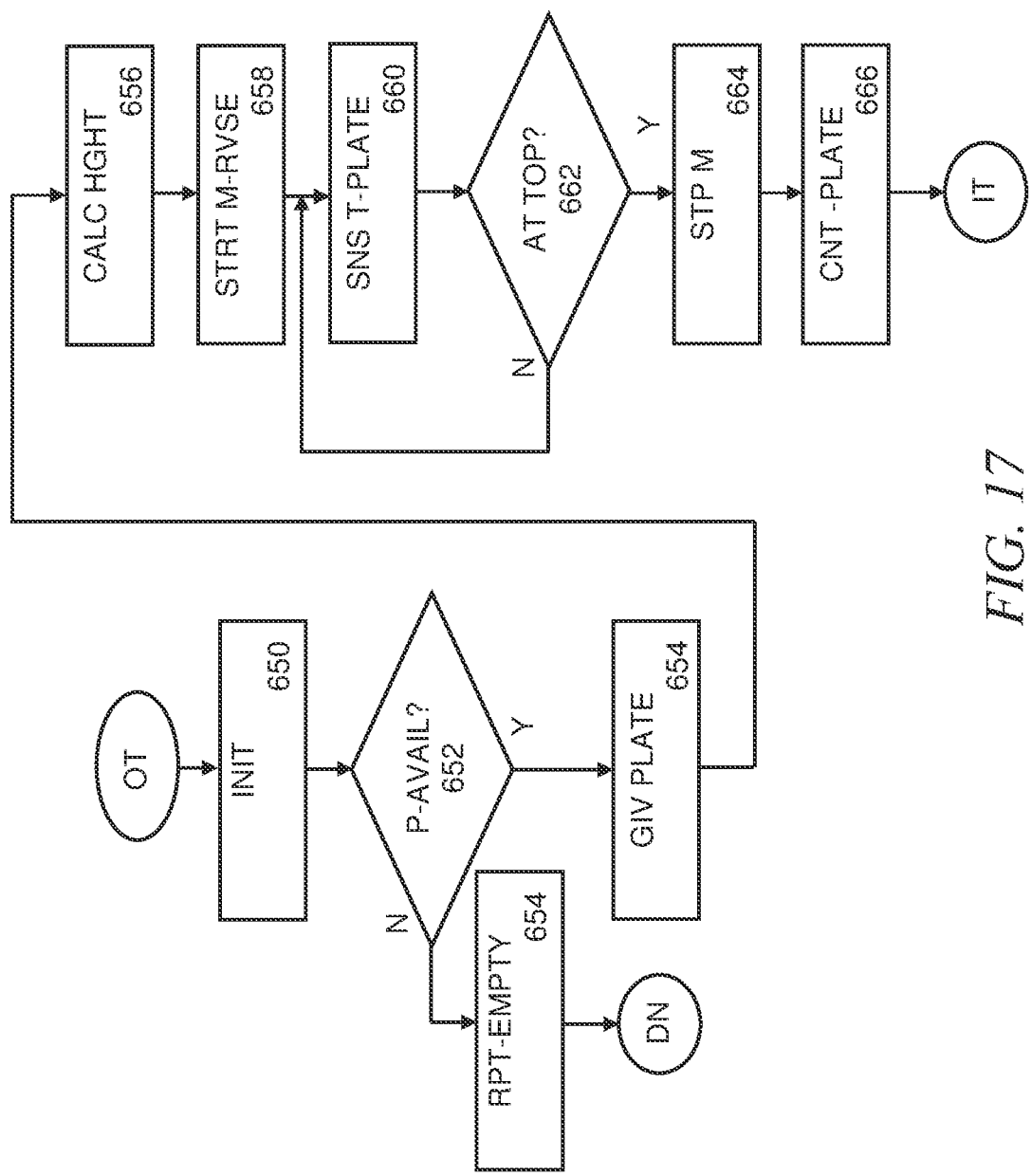
FIG. 17 illustrates a flow chart of an outtake (delivery) operation of the control system for the plate delivery mechanism.

Referring to FIG. 17, a flow chart of an outtake (delivery) operation of the control system 60 for the delivery mechanism 10 is shown. After initialization 650, a test 652 is made to verify that there is a plate 6 in the staging area. If the test 652 determines that there is no plate 6 in the staging area (e.g., the plate count is zero, so no plates 6 are present), an empty status is reported 654 and no plate 6 is available for outtake.

If the test 652 determines that there is a plate 6, the plate 6 at the staging area is taken (e.g., by the robot 90) and a plate-height calculation 656 is made (e.g., by a pre-set height that is administered or by using the sensors 11 to determine how high is the plate 6 with food on the plate 6. Now, the motor(s) 14A/14B are started 658 to operate in a direction (e.g., reverse of that in FIG. 9) to provide the next plate 6 and the location of the next plate 6 is sensed 660 (e.g., using sensors 11/11A) and a plate location test 662 is performed. If the plate location test 662 indicates that the top plate 6 has not moved to the staging area, the top plate 6 is again sensed 660 (e.g., using sensors 11/11A) and the plate location test 662 is again performed (motor(s) 14A/14B are still running) until the plate location test 662 indicates that the top plate is in the staging area, at which time the motor(s) 14A/14B are stopped 664 and the top plate 6 is ready for delivery (e.g., delivery to the robot 90). In some embodiments, a plate count is updated 666, providing data to the processor 70 as to how many plated 6 remain stored in the delivery mechanism 10.

Figure 18:
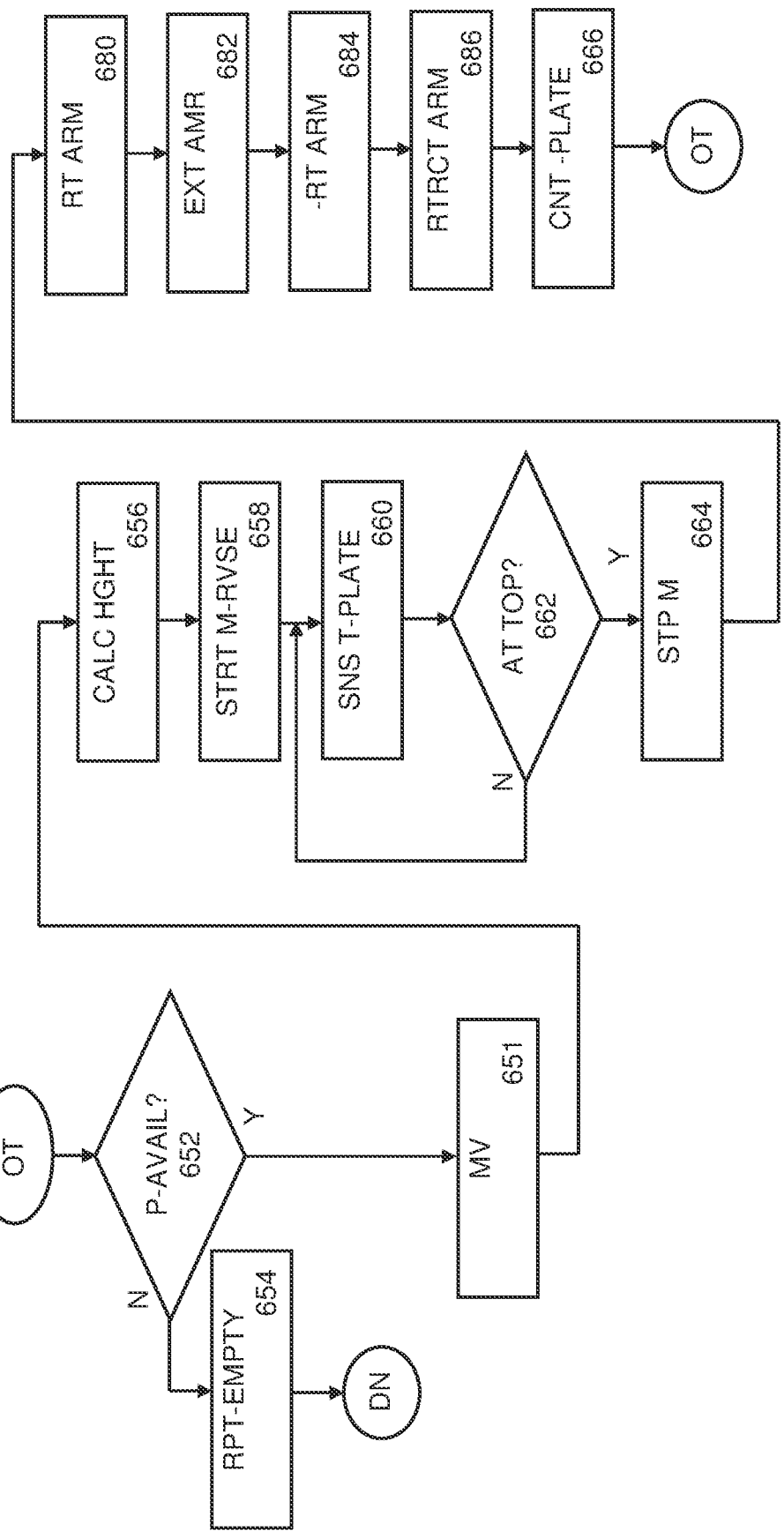
FIG. 18 illustrates a flow chart of an outtake (delivery) operation of the control system for the plate delivery mechanism.

Referring to FIG. 18, a flow chart of an outtake (delivery) operation of the control system 60 for the integrated delivery mechanism 10A is shown. A test 652 is made by the processor 70 to verify that there is a plate 6 ready. If the test 652 determines that there is no plate 6 ready (e.g., the plate count is zero, so no plates 6 are present), an empty status is reported 654 and no plate 6 is available for outtake.

If the test 652 determines that there is a plate 6, the integrated delivery mechanism 10A is moved 651 to the location of the surface 100 at which the plate 6 is to be delivered (e.g., using the Global Positioning Subsystem 91 and the relocation mechanism 2).

Once at the location of the surface 100, a plate-height calculation 656 is made (e.g., by a pre-set height that is administered or by using the sensors 11 to determine how high is the plate 6 with food on the plate 6. Now, the motor(s) 14A/14B are started 658 to operate in a direction (e.g., reverse of that in FIG. 9) to provide the next plate 6 and the location of the next plate 6 is sensed 660 (e.g., using sensors 11/11A) and a plate location test 662 is performed. If the plate location test 662 indicates that the top plate 6 has not moved to the staging area, the top plate 6 is again sensed 660 (e.g., using sensors 11/11A) and the plate location test 662 is again performed (motor(s) 14A/14B are still running) until the plate location test 662 indicates that the top plate is in the staging area, at which time the motor(s) 14A/14B are stopped 664 and the top plate 6 is ready for delivery.

Now, the delivery arms 124 are rotated 680 and the fingers 126 lift the plate 6 from the staging area. Once the plate is lifted, the delivery arms 124 are extended 682 to relocate the plate 6 to a position on the surface 100 where the plate 6 is to be placed and the delivery arms 124 are rotated 684 in an opposite direction of rotation to deposit the plate 6 on the surface. After the plate 6 is deposited on the surface 100, the delivery arm 124 is retracted 686 and ready for a next plate 6.

In some embodiments, a plate count is updated 666, providing data to the processor 70 as to how many plated 6 remain stored in the delivery mechanism 10.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for acceptance and delivery of plates, the system comprising:

a staging area into which the plates are accepted or delivered;

means for moving the plates, the means for moving the plates moving the plates from the staging area into a storage area and then from the storage area into the staging area in a last-in, first-out sequence;

whereas the means for moving the plates is driven by one or more electric motors;

whereas each plate of the plates is held distal from each other plate of the plates; and whereas the plates are returned to the staging area from the storage area in a same rotational position as the plate was accepted.

2. The system of claim 1, wherein the means for moving the plates comprises three or more spiral shafts, each of the three or more spiral shafts are driven by one or more electric motor(s), the electric motor(s) rotate the three or more spiral shafts in one rotational direction when moving the plates from the staging area into the storage area and rotate the three or more spiral shafts in a second rotational direction opposite of the one rotational direction when moving the plates from the storage area into the staging area; and wherein the plates directly contact spirals of the spiral shafts.

3. The system of claim 2, wherein the spiral shafts of a first subset of the spiral shafts are wound in a first direction and the spiral shafts of a second subset of the spiral shafts are wound in a second direction, opposite to the first direction, whereas when moving the plates from the staging area into the storage area, the electric motor(s) rotate the first subset of the spiral shafts in a clockwise rotation and the electric motor(s) rotate the second subset of the spiral shafts in a counter-clockwise rotation; and whereas when moving the plates from the storage area into the staging area, the electric motor(s) rotate the first subset of the spiral shafts in the counter-clockwise rotation and the electric motor(s) rotate the second subset of the spiral shafts in the clockwise rotation, thereby the plates are returned to the staging area from the storage area in a same rotational position as when the plates were accepted.

4. The system of claim 1, wherein the means for moving the plates comprises three or more shafts, each of the three or more shafts having a plurality of propellers, each of the propellers is driven by one or more of the electric motors, the one or more electric motors rotate the propellers in a first rotational direction when moving the plates from the staging area into the storage area and rotate the propellers in a second rotational direction opposite of the first rotational direction when moving the plates from the storage area into the staging area; and wherein the plates directly contact blades of the propellers.

5. The system of claim 4, wherein the one or more electric motors is a single motor that is mechanically interfaced to each of the propellers through linkages in the shafts.

6. The system of claim 4, wherein each of the propellers has an independent motor.

7. The system of claim 4, further comprising a processor, software stored in a non-transitory memory of the processor, the software controls the processor to control the one or more electric motors to rotate the plates to move the plates by a fixed distance.

8. The system of claim 1, wherein the means for moving the plates comprises three or more pairs of elongated shafts, each elongated shaft having a plurality of teeth for engaging directly with the plates, a first elongated shaft of each pair of elongated shafts offset from a second elongated shaft of that pair of elongated shafts by an angle, the first elongated shaft interfaced to the second elongated shaft by a rocker, the rocker driven by the one or more electric motors such that when moving the plates from the staging area into the storage area, the motors repeatedly move the first elongated shaft, the teeth of which are engaged with the plate, in a first linear direction while moving the second elongated shaft in a second linear direction that is opposite to the first linear direction, then the motors rotate the pairs of elongated shafts until the teeth of the second elongated shafts are engaged with the plate; and when moving the plates from the storage area into the staging area, the motors repeatedly move the first elongated shaft that, the teeth of which are engaged with the plate, in the second linear direction while moving the second elongated shaft in the first linear direction, then the motors rotate the pairs of elongated shafts until the teeth of the second elongated shafts are engaged with the plate.

9. The system of claim 1, further comprising a heater/chiller for keeping the plates and contents hot/cold.

10. The system of claim 1, further comprising telescoping delivery arms, each telescoping delivery arm having fingers, the telescoping delivery arms configured to rotate in a first direction for lifting the plates by the fingers and configured to rotate the telescoping delivery arms a second direction opposite of the first direction for placing plates at a destination location and the telescoping arms configured to telescope outwardly for delivery of the plates onto a surface at the delivery location and the telescoping arms configured to telescope inwardly after placing the plates.

11. A method of accepting and delivering plates from/to a staging area, the method comprising:

when accepting the plates, for each plate, receiving each of the plates in the staging area then moving the each plate into a storage area, thereby maintaining a last-in, first-out order of the plates in the storage area; and when delivering the plates to a destination location, moving one of the plates to the staging area and lifting the one of the plates by fingers affixed to telescoping arms, rotating the telescoping arms in a first, lifting rotational direction, then extending the telescoping arms to extend the one of the plates to the destination location, then rotating the telescoping arms in a releasing direction to deposit the one of the plates at the destination location.

12. The method of claim 11, wherein the step of moving each plate into a storage area comprises the each plate resting on a set of propellers, the set of propellers rotating in a first direction to drop the each plate onto a subsequent set of propellers that are also rotating in the first direction.

13. The method of claim 12, wherein the step of moving one of the plates to the staging area from the storage area comprises the plate resting on the subsequent set of propellers, the subsequent set of propellers rotating in a second direction opposite to the first direction to lift the plate onto the set of propellers that are also rotating in the second direction.

14. The method of claim 12, wherein rotating of the set of propellers and subsequent set of propellers is performed by at least one motor that is/are rotationally linked to each of the propellers.

15. The method of claim 12, rotating of the set of propellers and subsequent set of propellers is performed by motors, each of the propellers are rotationally linked directly to one of the motors.

16. The method of claim 12, further comprising after delivering the plate to a destination location, the destination location being a position on a table, energizing a table motor to rotate the table for depositing a next plate of the plates.

17. The method of claim 11, wherein the step of moving each plate into a storage area comprises engaging the plate with teeth of three pairs of elongated shafts, each elongated shaft of each pair of elongated shafts having a plurality of the teeth for engaging directly with the plates, a first elongated shaft of the pair of elongated shafts offset from a second elongated shaft of the pair of elongated shafts by an angle, the first elongated shaft interfaced to the second elongated shaft by a rocker, the step comprising:

(a) rotating the rocker in a first direction, thereby moving the first elongated shaft, the teeth of which are engaged with the plate, in a first linear direction while moving the second elongated shaft in a second linear direction that is opposite to the first linear direction;

(b) rotating the pairs of elongated shafts until the teeth of the first elongated shafts are disengaged with the plate and the teeth of the second elongated shafts are engaged with the plate;

(c) rotating the rocker in a second direction opposite of the first direction, thereby moving the second elongated shaft, the teeth of which are engaged with the plate, in the first linear direction while moving the first elongated shaft in the second linear direction;

(d) rotating the pairs of elongated shafts until the teeth of the second elongated shafts are disengaged with the plate and the teeth of the first elongated shafts are engaged with the plate; and (e) repeating steps a-d until the plate is in a desired position.

18. A system for acceptance and delivery of plates, the system comprising:

a staging area into which the plates are accepted or delivered one at a time;

a mechanism is configured to move a plate from the staging area into a storage area and the mechanism is also configured to move a last plate that was put into the storage area to the staging area;

two telescoping delivery arms mechanically interfaced to the system for acceptance and delivery of the plates at the staging area, each telescoping delivery arm having means for extending and retracting and means for rotating and each telescoping delivery arm terminating with fingers for lifting the plate from the staging area and depositing the plate at a destination location; and whereas when the plate is in the staging area, the telescoping delivery arms are rotated to lift the plate, then the telescoping delivery arms are extended to move the plate to the destination location then the telescoping delivery arms are rotated in an opposite direction to deposit the plate at the destination location, and then the telescoping delivery arms are retracted to return the fingers to the staging area.

19. The system of claim 18, wherein the mechanism comprises propellers mechanically interfaced to a motor, an edge of the plate is held by blades of the propellers such that the motor rotates the propellers in one rotational direction to move the plate from the staging area to the storage area and the motor rotates the propellers in an opposite rotational direction to move the plate from the storage area to the staging area.

20. The system of claim 18, wherein the mechanism comprises three or more pairs of elongated shafts, each elongated shaft having a plurality of teeth for engaging directly with the plates, a first elongated shaft of the pair of elongated shafts offset from a second elongated shaft of the pair of elongated shafts by an angle, the first elongated shaft interfaced to the second elongated shaft by a rocker, the rocker driven by an electric motor such that when moving the plates from the staging area into the storage area, the motor moves the first elongated shaft, the teeth of which are engaged with the plate, in a first linear direction while moving the second elongated shaft in a second linear direction that is opposite to the first linear direction, then the motor rotates the pairs of elongated shafts until the teeth of the second elongated shafts are engaged with the plate; and when moving the plates from the storage area into the staging area, the motor moves the first elongated shaft that, the teeth of which are engaged with the plate, in the second linear direction while moving the second elongated shaft in the first linear direction, then the motor rotates the pairs of elongated shafts until the teeth of the second elongated shafts are engaged with the plate.

\* \* \* \* \*